United States Patent
Lee et al.

(10) Patent No.: US 11,157,745 B2
(45) Date of Patent: Oct. 26, 2021

(54) AUTOMATED PROXIMITY DISCOVERY OF NETWORKED CAMERAS

(71) Applicant: Scenera, Inc., Palo Alto, CA (US)

(72) Inventors: David D. Lee, Palo Alto, CA (US); Andrew Augustine Wajs, Haarlem (NL); Seungoh Ryu, Newton, MA (US); Chien Lim, San Jose, CA (US)

(73) Assignee: Scenera, Inc., Palo Alto, CA (US)

( * ) Notice: Subject to any disclaimer, the term of this patent is extended or adjusted under 35 U.S.C. 154(b) by 202 days.

(21) Appl. No.: 15/900,489

(22) Filed: Feb. 20, 2018

(65) Prior Publication Data
US 2019/0258864 A1 Aug. 22, 2019

(51) Int. Cl.
*G06K 9/00* (2006.01)
*G06T 7/292* (2017.01)
*G06T 11/20* (2006.01)
*G06T 1/20* (2006.01)

(52) U.S. Cl.
CPC .......... *G06K 9/00758* (2013.01); *G06T 7/292* (2017.01); *G06T 11/206* (2013.01)

(58) Field of Classification Search
CPC .... G06K 9/00758; G06T 7/292; G06T 11/206
See application file for complete search history.

(56) References Cited

U.S. PATENT DOCUMENTS

| | | | |
|---|---|---|---|
| 6,031,573 A | 2/2000 | Maccormack et al. | |
| 6,628,339 B1 | 9/2003 | Ferland et al. | |
| 8,560,785 B1 | 10/2013 | Malhotra et al. | |
| 8,970,654 B1 | 3/2015 | Johnson et al. | |
| 9,225,889 B1 | 12/2015 | Korkin | |
| 2001/0043271 A1 | 11/2001 | Kawano | |
| 2004/0048507 A1 | 3/2004 | Hage | |
| 2005/0132385 A1 | 6/2005 | Bourges-Sevenier | |
| 2006/0055819 A1 | 3/2006 | Pokrovsky et al. | |
| 2006/0187338 A1 | 8/2006 | May et al. | |
| 2007/0195182 A1 | 8/2007 | Ito | |
| 2007/0216691 A1* | 9/2007 | Dobrin | H04N 5/247 345/473 |
| 2008/0074540 A1 | 3/2008 | Liu | |

(Continued)

FOREIGN PATENT DOCUMENTS

WO WO 2016/044778 A1 3/2016

OTHER PUBLICATIONS

PCT Invitation to Pay Additional Fees, PCT Application No. PCT/US17/48383, dated Oct. 18, 2017, 2 pages.

(Continued)

*Primary Examiner* — John W Lee
(74) *Attorney, Agent, or Firm* — Fenwick & West LLP

(57) ABSTRACT

Automated discovery of the relative positioning of a network of cameras that view a physical environment. The automated discovery is based on comparing TimeLines for the cameras. The TimeLines are time-stamped data relating to the camera's view, for example a sequence of time stamps and corresponding images captured by a camera at those time stamps. In one approach, the relative positioning is represented by a proximity graph of nodes connected by edges. The nodes represent spaces in the physical environment, and each edge between two nodes represents a pathway between the spaces represented by the two nodes.

16 Claims, 22 Drawing Sheets

(56) References Cited

U.S. PATENT DOCUMENTS

| | | |
|---|---|---|
| 2008/0211941 A1 | 9/2008 | Deever et al. |
| 2010/0250497 A1 | 9/2010 | Redlich et al. |
| 2010/0321528 A1 | 12/2010 | Yu et al. |
| 2011/0199497 A1 | 8/2011 | Motta |
| 2011/0211215 A1 | 9/2011 | Yamamoto |
| 2011/0234807 A1 | 9/2011 | Jones et al. |
| 2011/0242317 A1 | 10/2011 | Wengrovitz |
| 2012/0162366 A1 | 6/2012 | Ninan et al. |
| 2012/0258658 A1 | 10/2012 | Matsuo |
| 2012/0275640 A1 | 11/2012 | Widzinski et al. |
| 2012/0294583 A1 | 11/2012 | Kosaka et al. |
| 2013/0057713 A1 | 3/2013 | Khawand |
| 2013/0142438 A1* | 6/2013 | Schloegel ............ G06T 9/00 382/199 |
| 2013/0272627 A1 | 10/2013 | Chen et al. |
| 2013/0308036 A1 | 11/2013 | Peng |
| 2014/0022399 A1 | 1/2014 | Rashid |
| 2014/0306010 A1 | 10/2014 | Prokop |
| 2015/0146037 A1 | 5/2015 | Keelan |
| 2015/0227797 A1 | 8/2015 | Ko et al. |
| 2015/0244943 A1 | 8/2015 | Brown |
| 2015/0334285 A1 | 11/2015 | Zhang et al. |
| 2015/0350711 A1 | 12/2015 | Guzik |
| 2016/0044227 A1 | 2/2016 | Johnson et al. |
| 2016/0056964 A1 | 2/2016 | Andiappan et al. |
| 2016/0063036 A1 | 3/2016 | Kawai |
| 2016/0112630 A1 | 4/2016 | Kanumuri et al. |
| 2016/0134932 A1 | 5/2016 | Karp et al. |
| 2017/0093852 A1 | 3/2017 | Khosravi et al. |
| 2017/0180386 A1 | 6/2017 | Dewan et al. |
| 2017/0336858 A1 | 11/2017 | Lee et al. |
| 2018/0149481 A1* | 5/2018 | Hirai ............ G06T 5/002 |

OTHER PUBLICATIONS

PCT International Search Report and Written Opinion, PCT Application No. PCT/US17/48383, dated Dec. 22, 2017, 18 pages.

U.S. Appl. No. 15/487,416, filed Apr. 13, 2017, Inventors: David D. Lee et al.

PCT International Search Report and Written Opinion, PCT Application No. PCT/US17/32268, dated Sep. 15, 2017, 22 pages.

PCT International Search Report and Written Opinion, PCT Application No. PCT/US17/32269, dated Sep. 14, 2017, 24 pages.

Application Programming Interface, Wikipedia.org, Last edited Oct. 20, 2017, 9 pages, [Online] [Retrieved on Oct. 24, 2017] Retrieved from the Internet at<URL: https://en .wikipedia.org/wiki/Application_programmina_interface>.

Encryption, Wikipedia.org, Last edited Oct. 3, 2017, 5 pages, [Online] [Retrieved on Oct. 24, 2017] Retrieved from the Internet at <https://en.wikipedia.org/wiki/Encryption>.

PCT International Search Report and Written Opinion, PCT Application No. PCT/US17/32267, dated Jul. 31, 2017, 28 pages.

PCT Invitation to Pay Additional Fees, PCT Application No. PCT/US17 /32268, dated Jul. 18, 2017, 2 pages.

PCT Invitation to Pay Additional Fees, PCT Application No. PCT/US17 /32269, dated Jul. 18, 2017, 2 pages.

\* cited by examiner

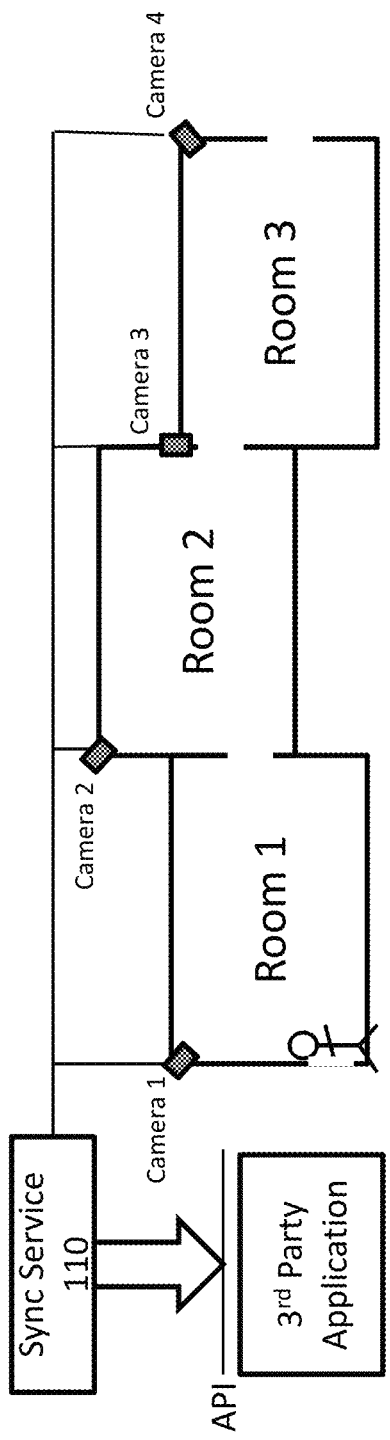
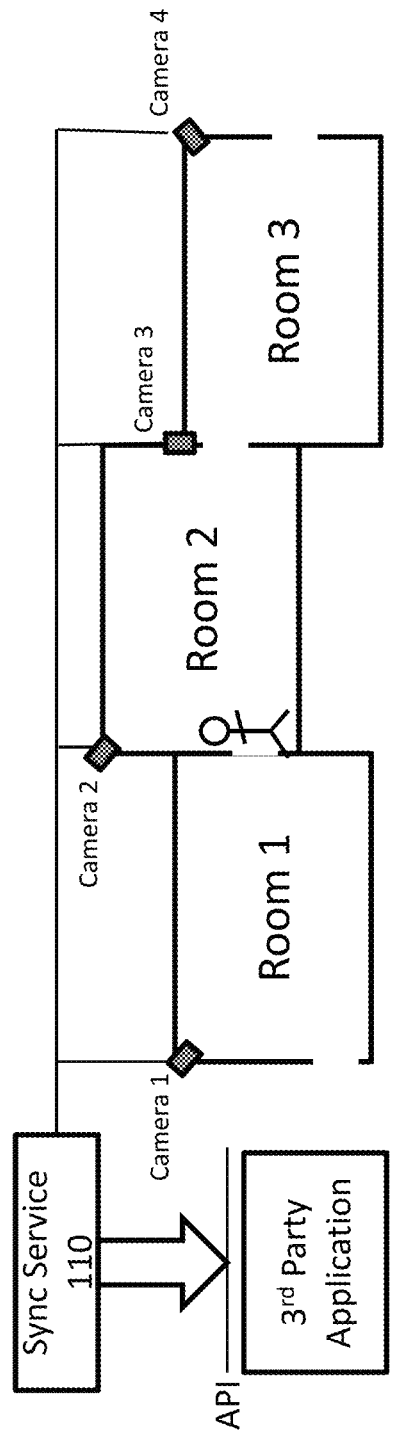
FIG. 1A
FIG. 1B

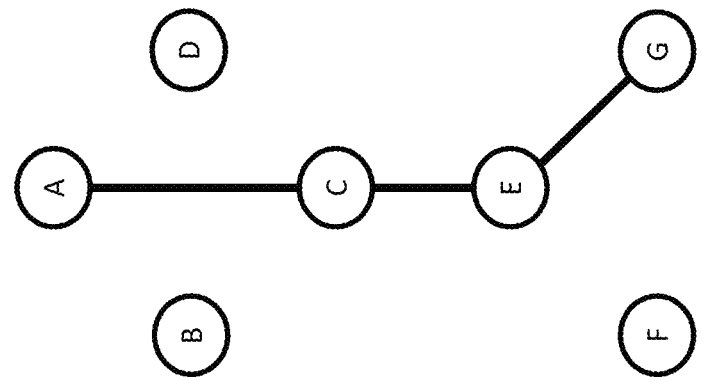
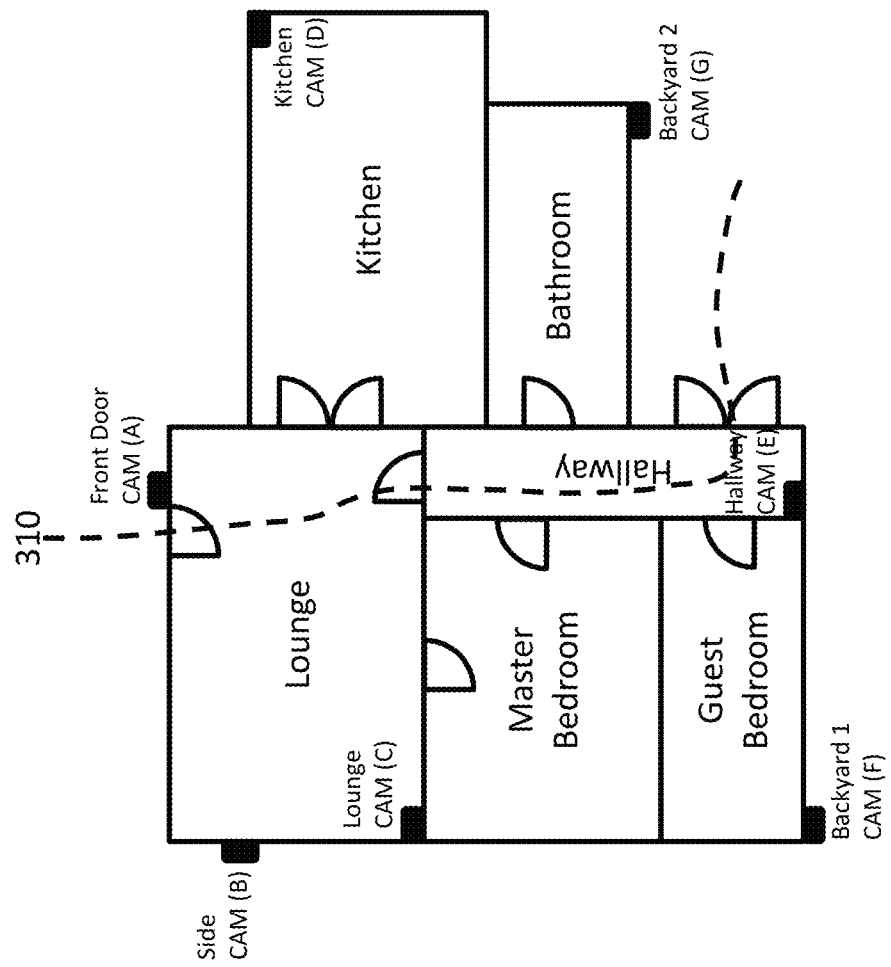
FIG. 3B

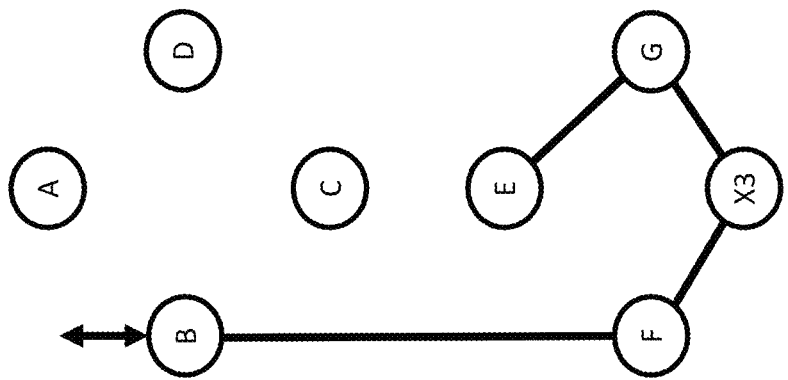
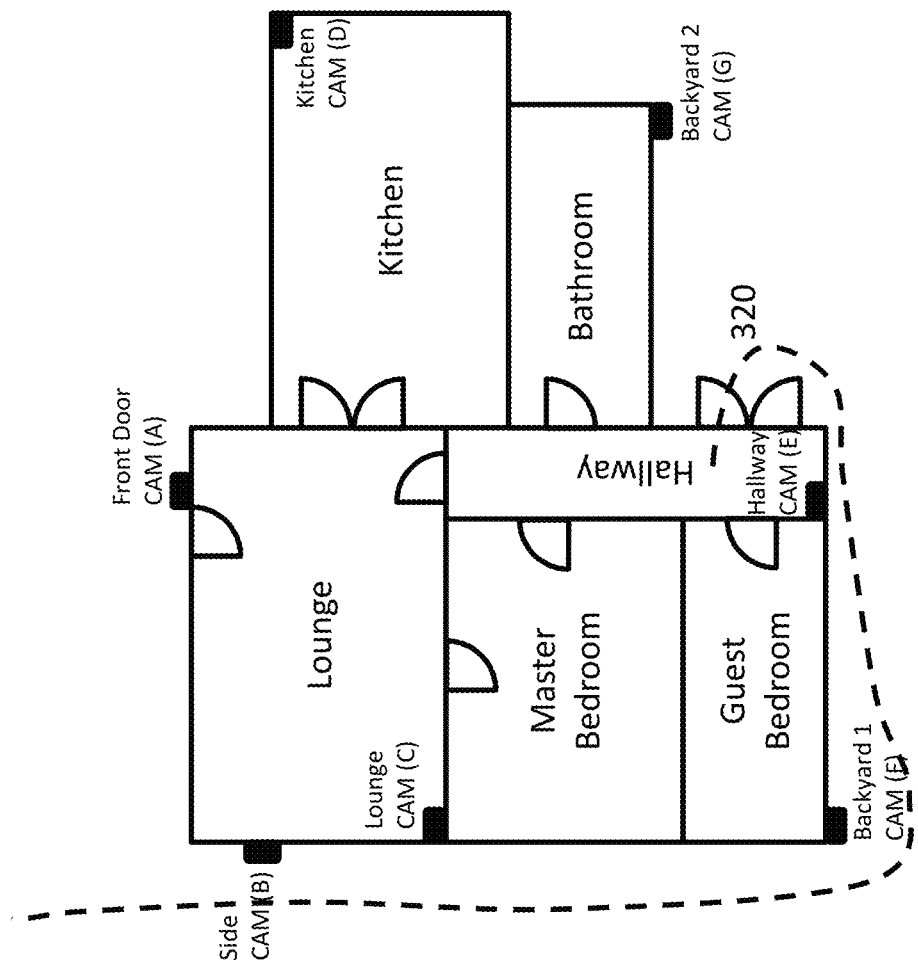
FIG. 3F

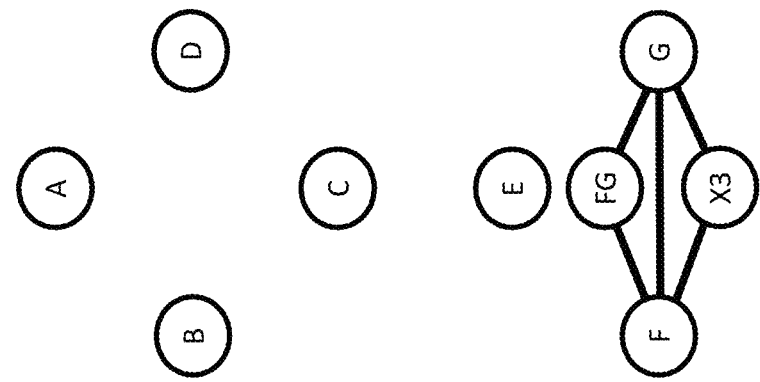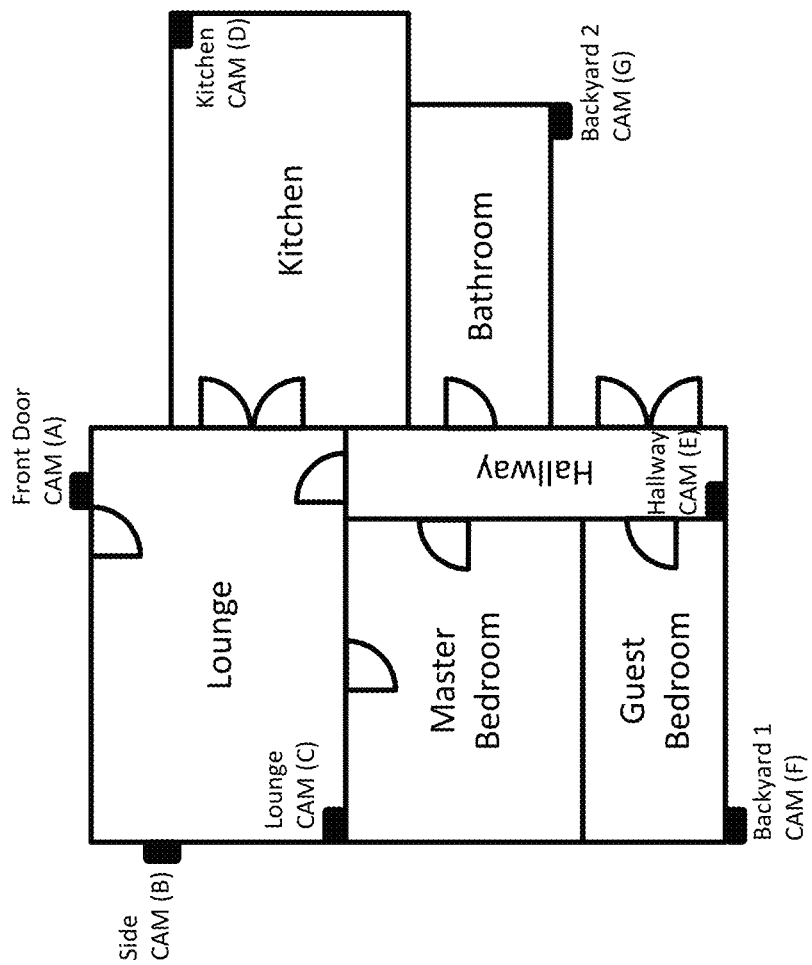
FIG. 3G

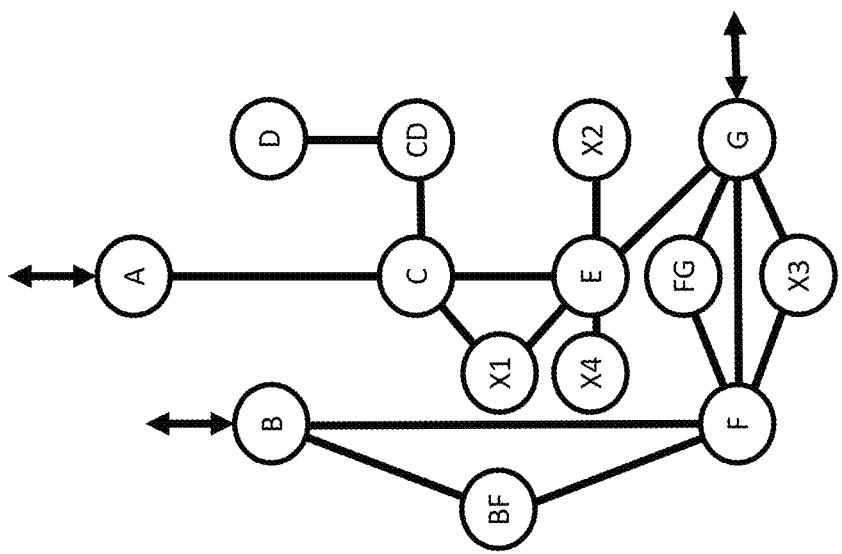
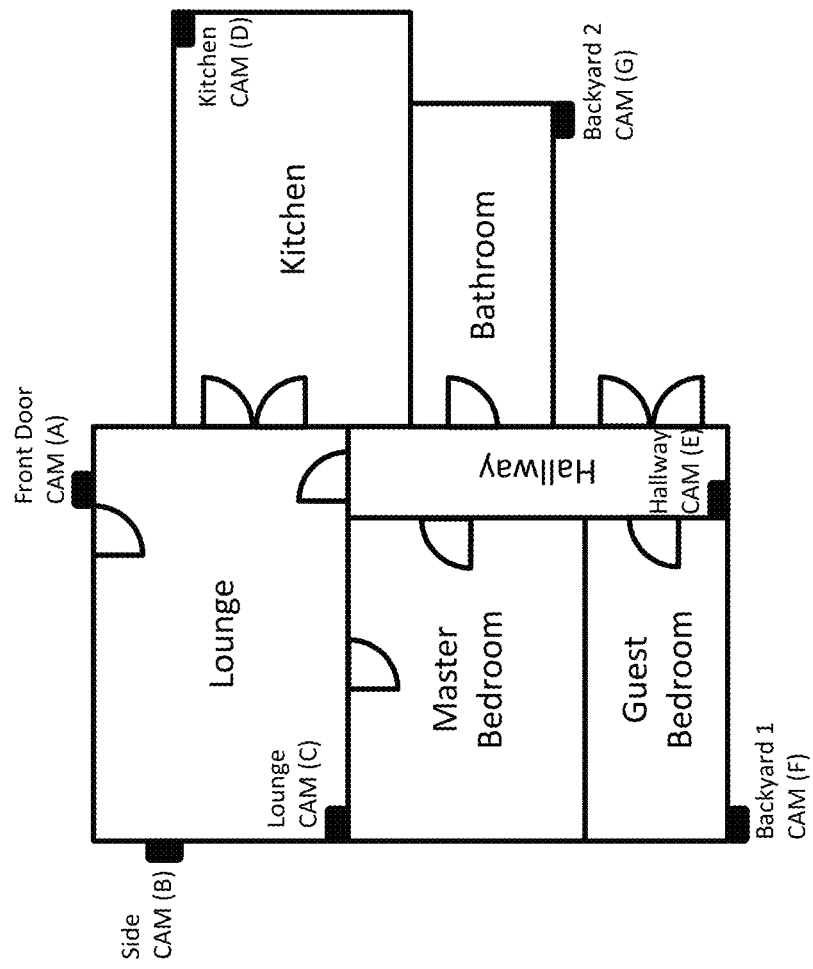
FIG. 3H

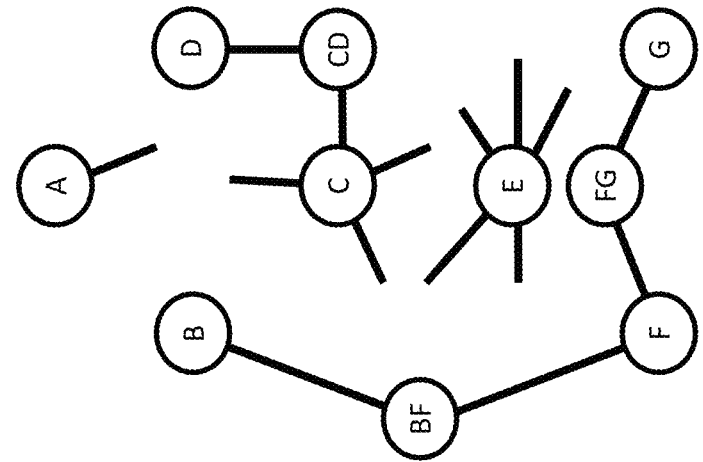
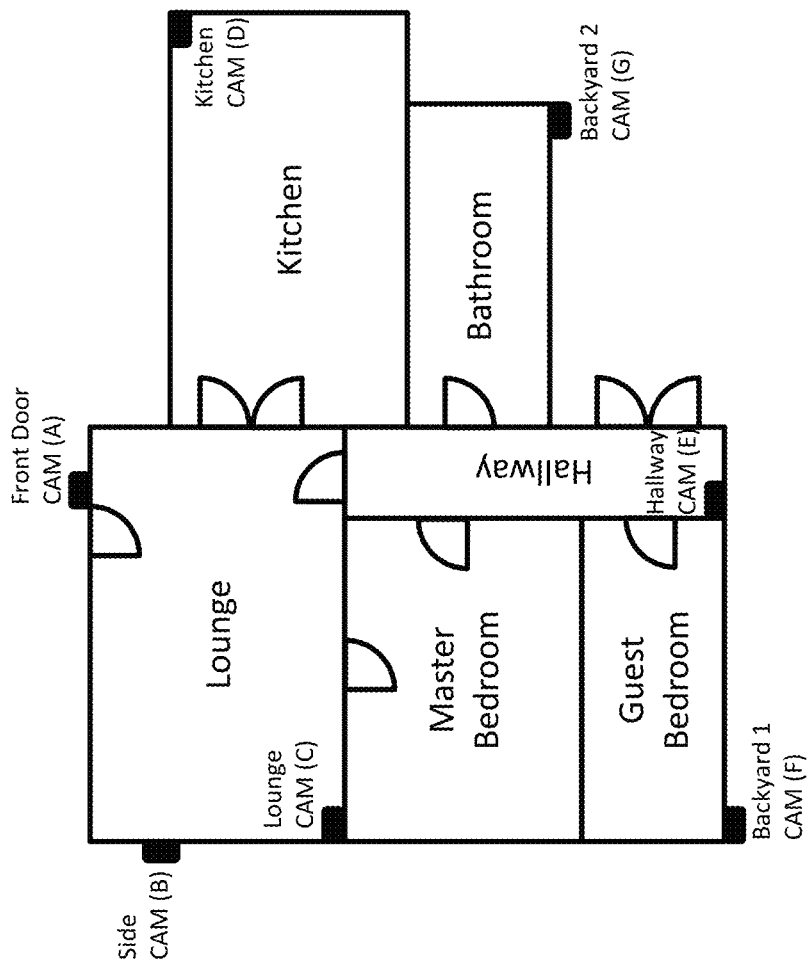
FIG. 3J

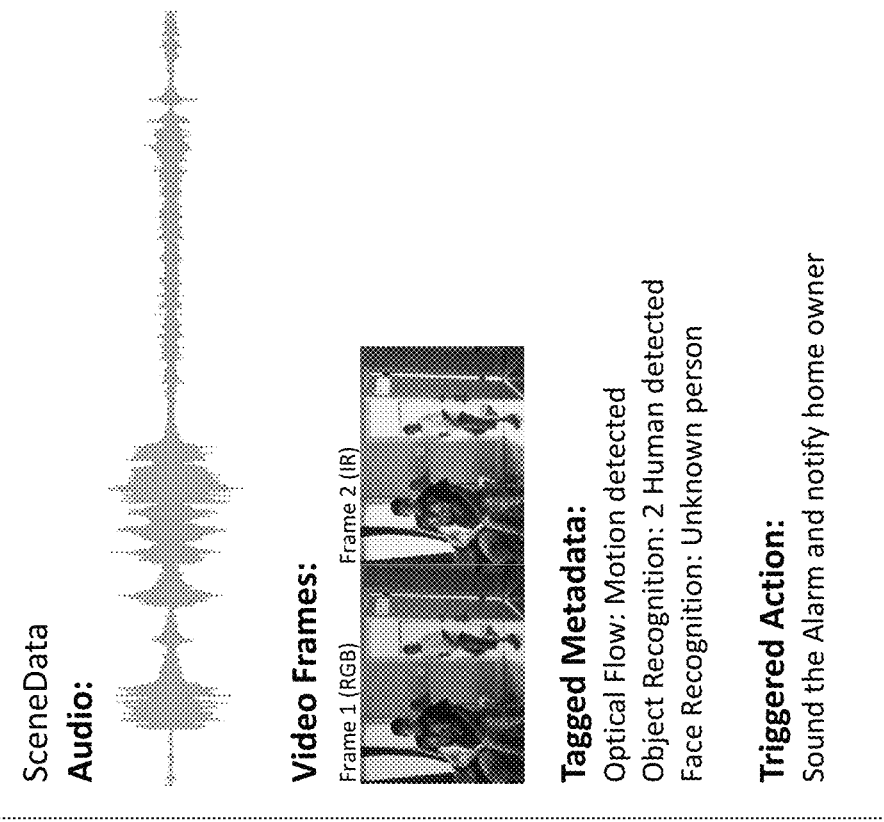
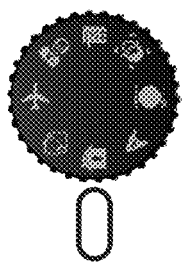
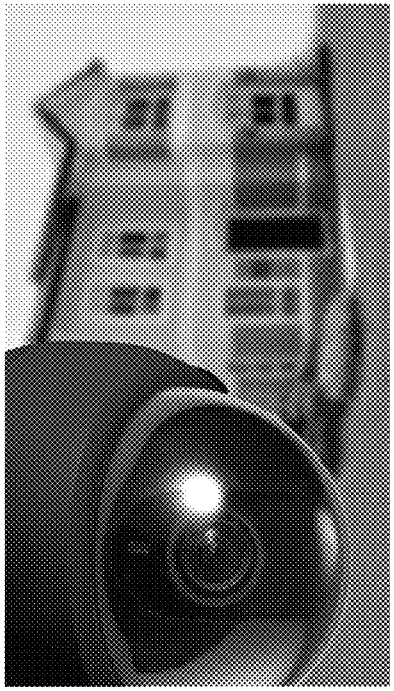
FIG. 8

AUTOMATED PROXIMITY DISCOVERY OF NETWORKED CAMERAS

BACKGROUND

1. Technical Field

This disclosure relates generally to obtaining information about networks of sensor devices, including for example cameras.

2. Description of Related Art

Millions of cameras and other sensor devices are deployed today. There generally is no mechanism to enable computing to easily interact in a meaningful way with content captured by different cameras within a network. Human monitoring is often required to make sense of captured videos. There is limited machine assistance available to interpret or detect relevant data in images and even fewer options to do so for images captured by different cameras in proximity to each other. This results in most data from cameras not being processed in real time and, at best, captured images are used for forensic purposes after an event has been known to have occurred.

Another problem today is that the processing of information is highly application specific. Applications such as advanced driver assisted systems and security based on facial recognition require custom built software which reads in raw images from cameras and then processes the raw images in a specific way for the target application. The application developers typically must create application-specific software to process the raw video frames to extract the desired information. The application-specific software typically is a full stack beginning with low-level interfaces to the sensor devices and progressing through different levels of analysis to the final desired results. When multiple cameras are used, the application developer typically must also know the physical layout of the environment viewed by the cameras and the positioning of the cameras within that layout.

As a result, the development of applications that make use of networks of sensors is both slow and limited. For example, surveillance cameras installed in an environment typically are used only for security purposes and in a limited way. It is often desirable to take advantage of the proximity of cameras, for example to track objects as they move through the environment. To do this, the physical layout of the environment and the camera positions within the environment typically are manually determined, often during installation of the cameras, and then this information is used in the development of the surveillance application. However, as cameras are added, removed or repositioned, the software may have to be manually updated to take account for these changes in the physical installation.

Thus, there is a need for more flexibility and ease in determining the positioning of sensor devices within a physical environment and in accessing and processing data captured by these sensor devices, including images and video captured by cameras.

SUMMARY

The present disclosure overcomes the limitations of the prior art by providing automated discovery of the relative positioning of a network of cameras that view a physical environment. The automated discovery is based on comparing TimeLines for the cameras. The TimeLines are time-stamped data relating to the camera's view, for example a sequence of time stamps and images captured by a camera at those time stamps.

In one approach, the relative positioning is captured in a proximity graph of nodes connected by edges. The nodes represent spaces in the physical environment, and each edge between two nodes represents a pathway between the spaces represented by the two nodes. Construction of the proximity graph may begin as a set of unconnected nodes, with one node per camera representing the space viewed by each camera. The TimeLines are used to track objects as they move through different cameras' fields of view. This information is used to construct edges connecting nodes, and also to add, split, merge and otherwise modify the nodes, for example to account for spaces that are not viewed by any camera or spaces that are viewed by more than one camera. These techniques are automated so that the proximity graph may be continuously constructed (i.e., automatically updated) in response to changes in the camera network or the environment.

Other information may also be used to construct the proximity graph. Examples include recognition of the type of environment (e.g., type of room) that a camera is viewing, recognition of entries and exits to the space viewed by a camera (e.g., doors and other portals), the geolocation and/or orientation of a camera, and the physical layout of the environment.

Once constructed, the proximity graph can be used to enhance information captured by the network of sensors. For example, the proximity graph contains useful information to assist in tracking objects through the environment. Behavior of objects over time may form the basis of different types of services: home security and care of frail individuals, for example.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A-1C illustrate an example of automated discovery of camera proximity.

FIGS. 3A-3I are examples illustrating the construction of a proximity graph.

FIG. 3J is another example of an initial proximity graph.

FIG. 8 illustrates an example SceneMode.

DETAILED DESCRIPTION OF THE PREFERRED EMBODIMENTS

Figure 1C:
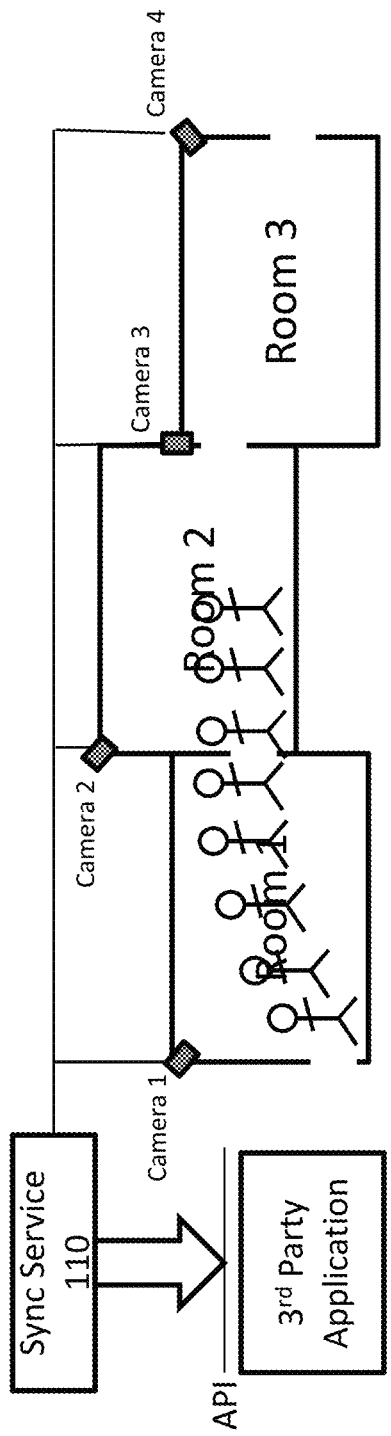

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIGS. 1A-1D illustrate an example of automated discovery of camera proximity. In this example, a network of cameras 1-4 view a physical environment that includes rooms 1-3. Camera 1 views room 1, camera 2 views room 2, camera 3 views a doorway between rooms 2 and 3, and camera 4 views room 3. However, the relative positioning of the rooms and the cameras is not known. An synchronization service 110 receives TimeLines for the cameras. A TimeLine is a sequence of time stamped data relating to the camera's view, typically including images acquired by the camera. By comparing these TimeLines, the synchronization service 110 can determine the proximity of spaces viewed by the cameras. The synchronization service 110 may do so in response to requests from third party applications and/or in order to provide more meaningful processing of data received from the cameras. The synchronization service 110 may interface to third party applications and to the cameras via standardized APIs.

Determining the proximity of spaces viewed by the cameras will be referred to as a synchronization operation or synchronization orchestration. In the following examples, the sync operation is performed by the synchronization service 110 and the corresponding data within each camera will be referred to as sync data. Sync data can include user information, user entries of hierarchical location/region, grouping (places), overlapping information (directional to other adjacent cameras with the same location or group) and other relevant information that can help the synchronization of cameras among themselves.

In FIG. 1A, a person enters camera 1's view. Camera 1 provides to the synchronization service 110 TimeLine information, including a time stamp which is the time of first entry. As the person travels through camera 1's view (i.e., through room 1), a sequence of time stamped movement (i.e., TimeLine) is recorded. The data and images of the person can be enriched as more scenes are captured. For example, facial recognition may increase in confidence as more facial images of the same person are captured. In FIG. 1B, the person is leaving camera 1's view and entering camera 2's view. Camera 2 provides to the synchronization service 110 its TimeLine information. FIG. 1C shows the person's movement through rooms 1 and 2, generating TimeLines from both cameras 1 and 2.

By comparing the TimeLines, the synchronization service 110 identifies the person in camera 2's view as the same person that was previously in camera 1's view. If the TimeLines include higher level metadata, such as an identity of the person in the TimeLine, then the synchronization service 110 may make this determination based on the metadata. If the TimeLines include just base image information, then the synchronization service 110 may perform more sophisticated processing to track an object through the physical space.

If the person is identified as present in both camera 1's and camera 2's viewing areas at the same time, then the two cameras' views are overlapping. If the person is tracked as leaving camera 1's viewing area and then appearing in camera 2's viewing area without delay (which is the case shown in FIG. 1), then the two cameras' views are adjacent. If the person is tracked as reappearing in camera 2's viewing area after a delay, then there likely is some intermediate area between the two cameras' views. That intermediate area may be viewed by another camera, or not viewed at all.

Based on this type of analysis, the synchronization service 110 determines the proximity of spaces viewed by the cameras. In one approach, this information is captured in a graph, which will be referred to as a proximity graph. The proximity graph includes nodes connected by edges. The nodes represent spaces in the physical environment, and the edges represent possible pathways between the nodes.

Figure 1D:
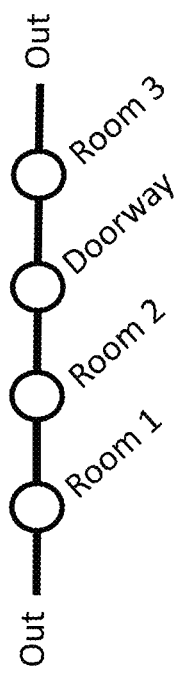
FIG. 1D is an example of a proximity graph for the environment of FIGS. 1A-1C.

FIG. 1D is an example of a proximity graph for the environment of FIGS. 1A-1C. The circles are nodes and the solid lines are edges. In this simple example, there is one node for each camera. The node for room 1 corresponds to camera 1's view, the node for room 2 corresponds to camera 2's view, the doorway node corresponds to camera 3's view, and the node for room 3 corresponds to camera 4's view. Because there is only one linear path through the rooms, the proximity graph in FIG. 1D is also a linear set of edges without branching or forking. At each end of the graph, there are edges connected to the outside environment, labelled as "Out." These are pathways between Room 1 and Out, and between Room 3 and Out.

There are different ways to enter or generate this information. A user may interact with a web interface entering data fields. Alternatively, a user may take actions that train the network. For example, the user may set the cameras' network into learning mode and then walk through the environment, taking different valid routes from one camera's field of view to the next. This may make it easier for the synchronization service to learn the proximity of the cameras. If only a single user moves through the space during the training phase, the camera network need only detect motion to make the mapping and not process face information to track people. It may also make it easier for the camera network to detect overlapping camera views. If only one person is moving through the camera fields of view, if two cameras detect motion at the same time, they have an overlapping field of view. This training may be further enriched if the camera has a microphone and is connected to a voice processing system. The user may provide a commentary as he moves through the fields of view of the cameras. A person entering the living room during the training mode may make the statement "I am in the living room." When he leaves, he may state "I am leaving the house." The user may also state rules regarding who may enter a space—for example "This is my bedroom and I do not expect strangers in this room unattended." The user may also train the camera to recognize members of the family or guests. Similar approaches may be taken in an office complex or other space.

Figure 2:
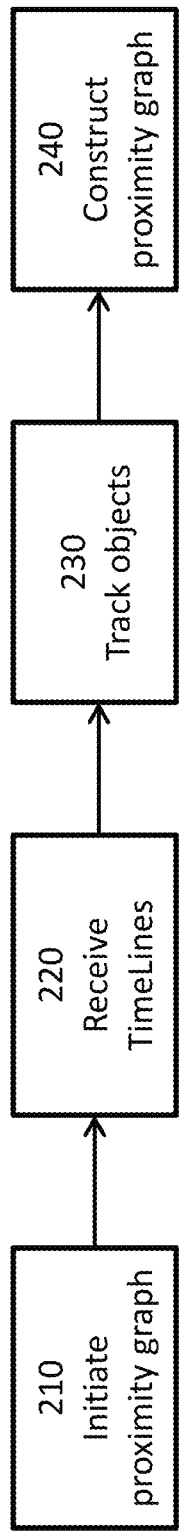
FIG. 2 is a flow diagram of a method for automated construction of a proximity graph.
Figure 3A:
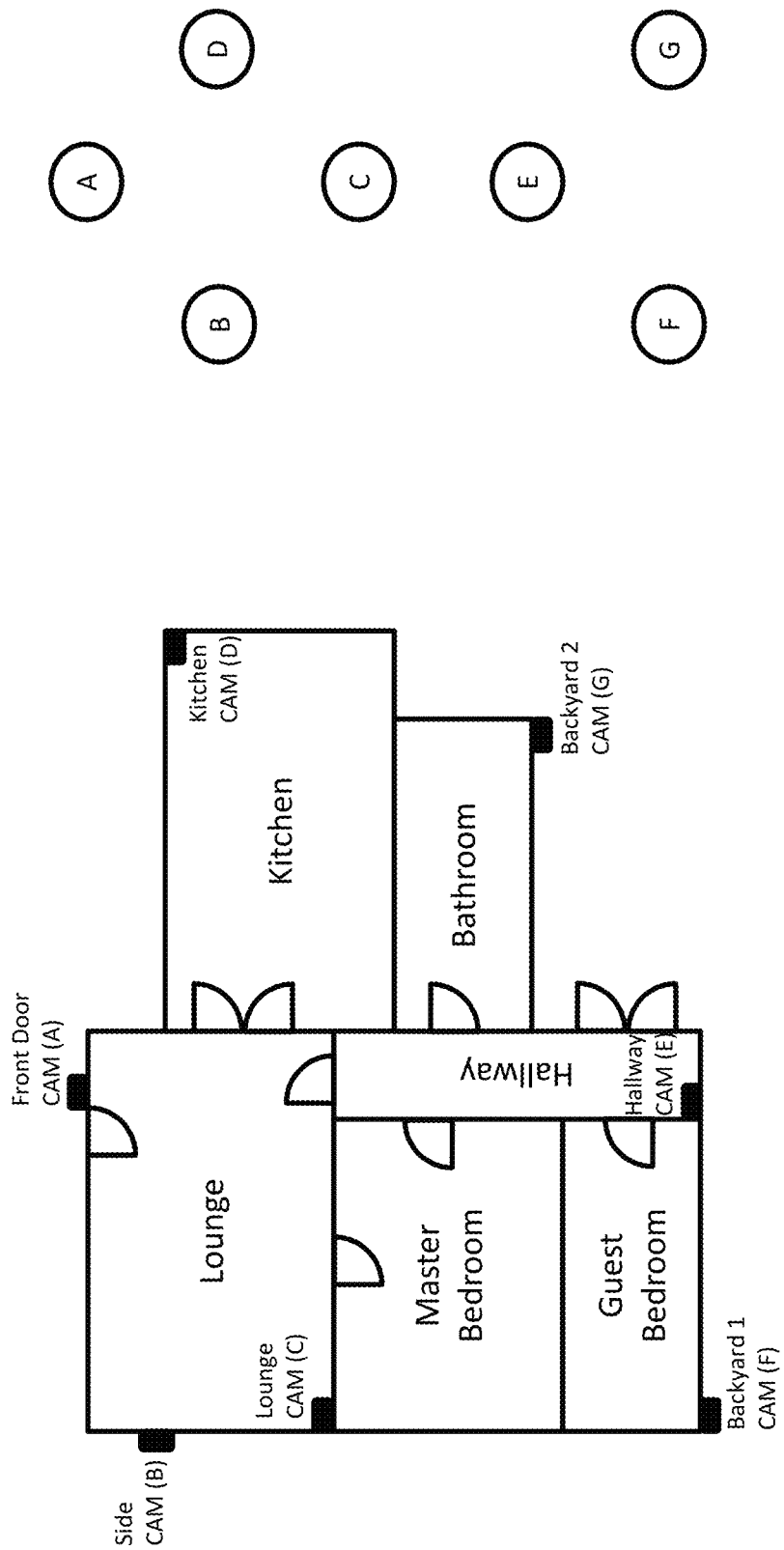

FIG. 2 is a flow diagram of a method for automated construction of a proximity graph. This method will be explained in conjunction with the more complex example shown in FIGS. 3A-3I. In this example, the physical environment is a residential house. FIG. 3A shows a floor plan of the house, which includes a lounge, kitchen, bathroom, two bedrooms and a hallway. The network of cameras includes seven cameras, labelled A-G. Cameras A, B, F and G view the exterior. Camera A views the front door and surrounding patio area. Camera B views the side yard. Cameras F and G view different parts of the backyard. Cameras C, D and E view different spaces inside the house. Camera C views the lounge, camera D views the kitchen and camera E views the hallway. There are no cameras in either bedroom or the bathroom. For simplicity, assume there are no blind spots. That is, camera C views the entire lounge with no blind spots.

The proximity graph is constructed as follows. It is initiated 210 by creating nodes for each of the cameras, as shown on the righthand side of FIG. 3A. The circle with A is the node representing the space viewed by camera A, and so on. There are seven nodes for the seven cameras. If there are known pathways between the different spaces, the graph can be initiated with corresponding edges (see FIG. 3J below). In this example, the graph is initiated without edges.

TimeLines for the cameras are received 220 and analyzed to track 230 objects moving through the environment. The proximity graph is constructed 240 based on the tracked objects. FIGS. 3B-3G show some examples. In these examples, the object is a person moving through the environment in his daily routine. Alternatively, a person could be instructed to move in a specific manner through the environment as part of an initialization process, or a person such as a security guard with a known and fairly exhaustive route may be tracked. The object also does not have to be a person. A robot or aerial drone could be programmed to do so. By using a more deliberate movement pattern, the entire physical environment can be explored and mapped in a more systematic manner. The object could also provide additional information to assist mapping, such as its GPS coordinates or which room it is located in.

In FIG. 3B, the person enters the front door, walks through the lounge to the hallway and then exits to the backyard. His path 310 is shown by the dashed line. Along this path 310, the person is first viewed by camera A (front door camera), then camera C (lounge camera), then camera E (hallway camera) and then camera G (backyard 2 camera). Because the person is walking and the spaces viewed by these cameras are directly adjacent without gaps, there is no significant delay from when the person leaves one camera's view to when he enters the next camera's view. The spaces viewed by these cameras are already represented by existing nodes in the proximity graph. Therefore, the synchronization service constructs edges between A-C, C-E and E-G, as shown on the righthand side of FIG. 3B.

Figure 3C:
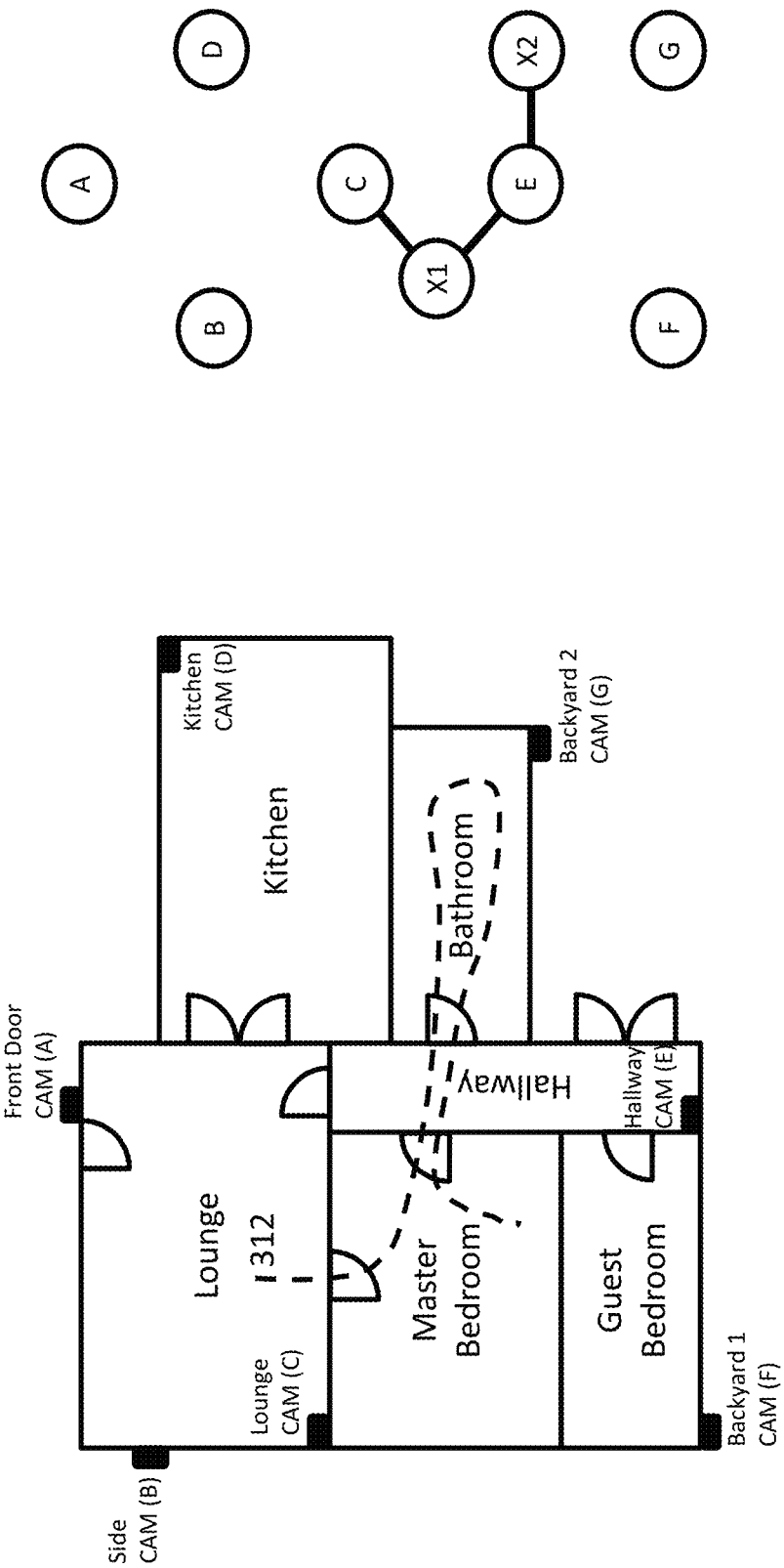

In FIG. 3C, the person starts in the lounge and then walks to the master bedroom. He later emerges from the bedroom, walks through the hallway to the bathroom and then returns to the master bedroom. Along this path 312, the person is first viewed by camera C (lounge camera) and then disappears from view when he enters the master bedroom. He later reappears in camera E (hallway camera), disappears as he enters the bathroom, reappears in camera E and then disappears again. In the first part of path 312, because the person disappears between cameras C and E, the synchronization service does not construct an edge directly between the existing nodes for C and E. Rather, a new node X1 representing a non-viewed space is added and edges are constructed from C-X1 and X1-E. Similarly, when the person enters and exits the bathroom, a new node X2 representing this non-viewed space is added and an edge is constructed between E-X2. The synchronization service may determine that X1 and X2 are two different spaces because it recognizes the different doors viewed by the hallway camera E. Non-viewed nodes may also be used to represent blind spots. For example, if the lounge camera cannot view the entire lounge, then the person may enter and exit the camera's view, even though he remains in the lounge. This blind spot may be represented by a node for non-viewed space.

Figure 3D:
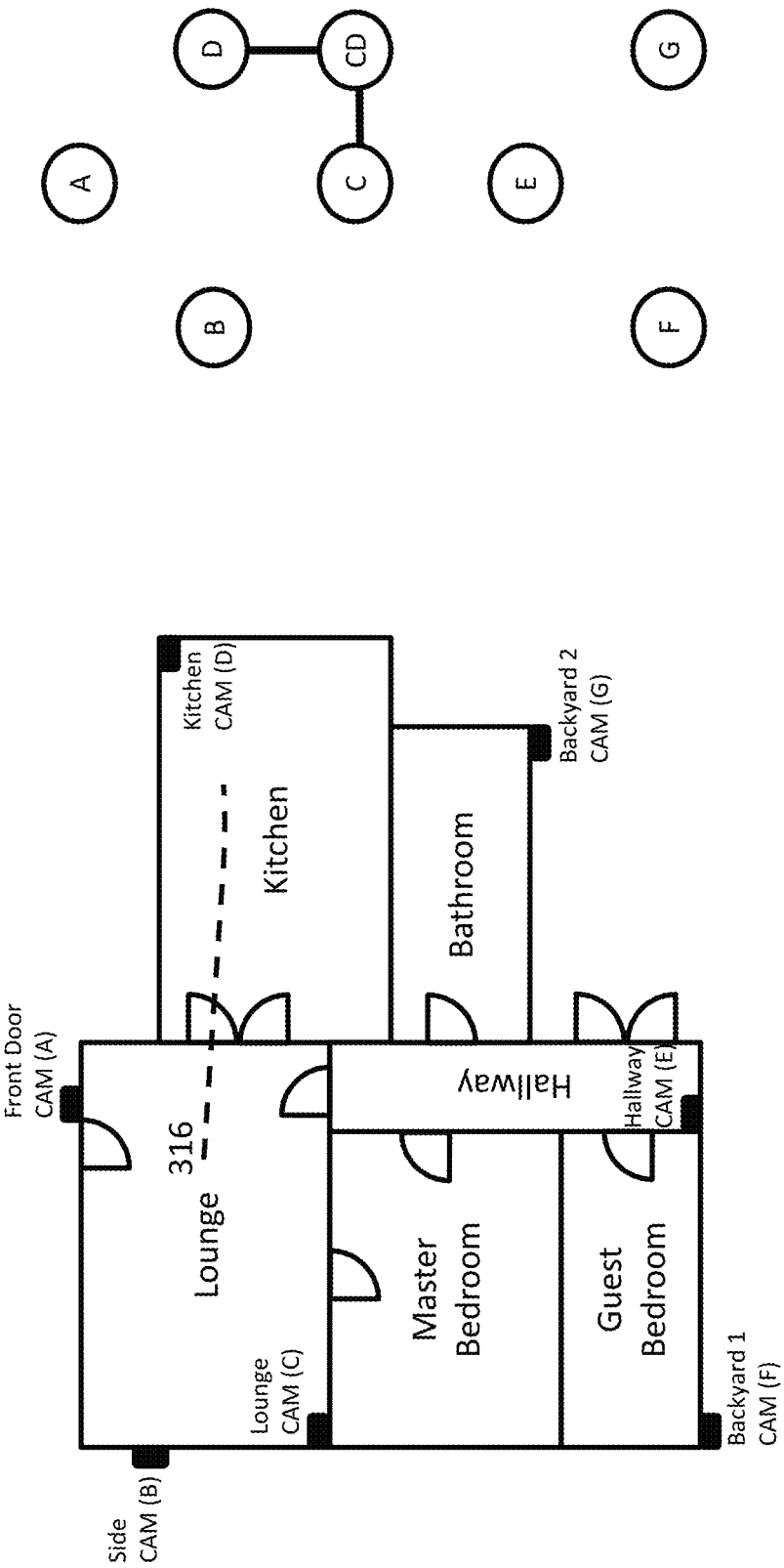

In FIG. 3D, the person starts in the lounge and walks to the kitchen. Along this path 316, the person is first viewed by camera C (lounge camera) and then by camera D (kitchen camera). However, the double door between the lounge and kitchen is a glass door so that camera C can view into the kitchen and camera D can also view into the lounge. That is, there is some space that can be seen by both cameras C and D. Accordingly, on the TimeLines, there is a period of time when the person appears in both cameras' views. To account for this, a new node CD is added to the graph, and edges are constructed from C-CD and CD-D. Node C represents the spaced viewed by only camera C, node D represents the space viewed by only camera D, and node CD represents the space viewed by both cameras C and D. The "pathway" between nodes CD and C is not a physical door or portal but just the boundary where camera D's view ends but camera C's view continues.

Figure 3E:
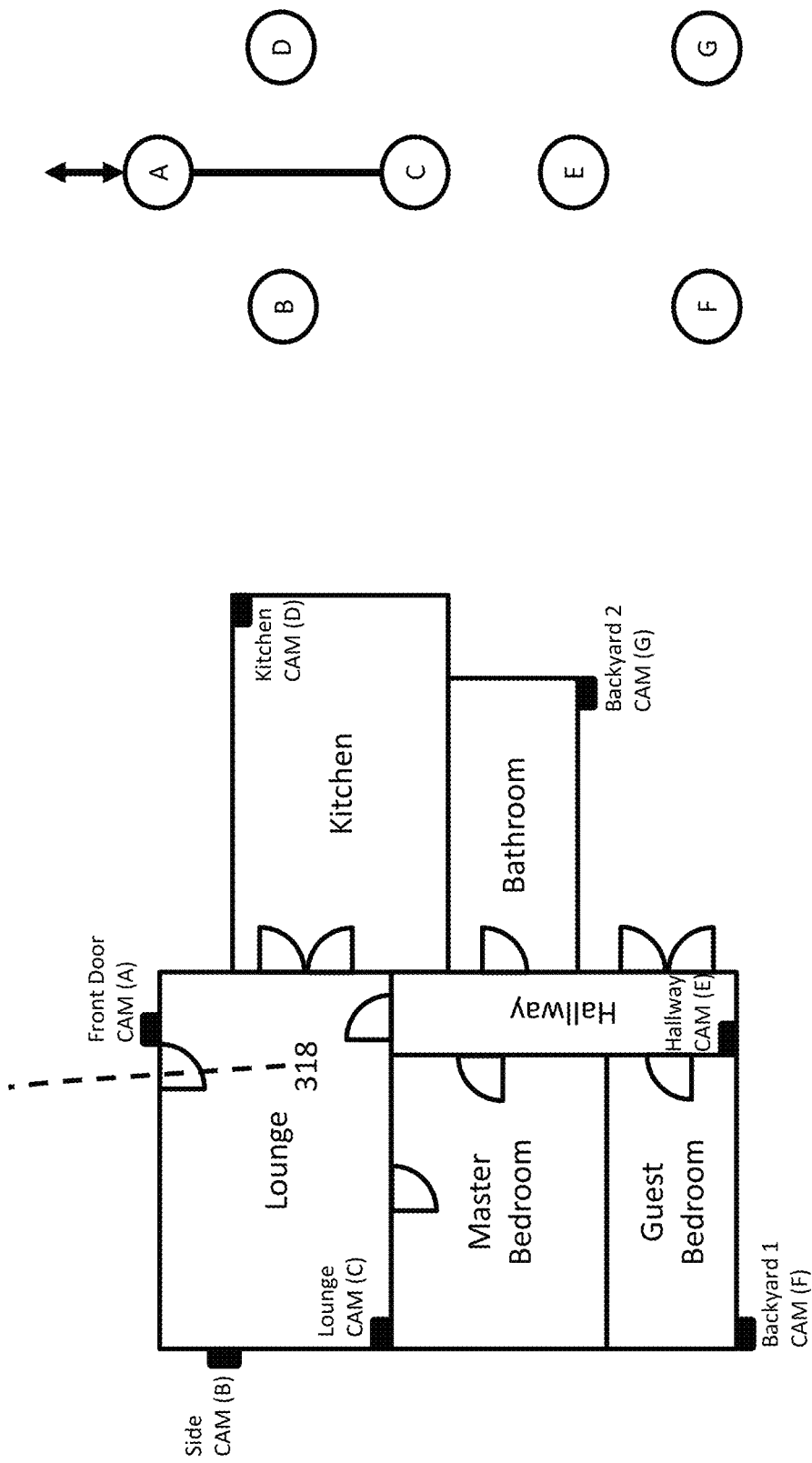
Figure 31:
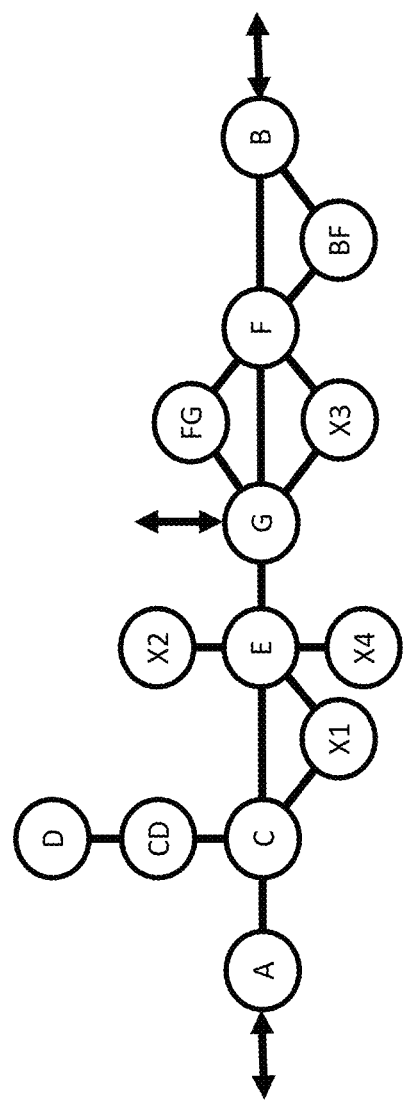

In FIG. 3E, the person starts in the lounge, exits the house through the front door and then leaves the premises entirely. In this path 318, the person is first viewed by camera C (lounge camera) and then by camera A (front door camera), and then he leaves the field of view of all cameras. The edge from C-A is straightforward. The movement from camera A to off-premises could be handled as a non-viewed space X, as in FIG. 3C. However, since the person is leaving the premises entirely (as opposed to entering a non-viewed room as in FIG. 3C), a special edge is added to the graph. In FIG. 3E, the special edge is shown as a double arrow edge with no connecting node on one side. This indicates that there is a pathway from node A to outside the physical environment of interest.

In FIG. 3F, the person starts in the hallway, exits the house through the back door, walks around the backyard to the side yard and then leaves the premises. In this path 320, the person is first viewed by camera E (hallway camera) and then by camera G (backyard camera). However, there is a blind spot between the two backyard cameras G and F, so the person disappears for a while and then reappears in camera F. Assuming no other blind spots, the person then moves to camera B (side camera) and then leaves the premises.

The edge from E-G is straightforward. The blind spot between G and F could be handled as a non-viewed space X3, as shown in FIG. 3F. However, if it is known that the only pathways from the blind spot are to nodes F and G, for example if the backyard is fenced and there are no alternate pathways, then the blind spot could be represented as an edge from F-G but with a blind spot along the edge. The remaining path F-B and B-off premises is straightforward.

Note that there can be multiple paths between adjacent cameras. FIG. 3G shows three paths between nodes F and G. The edges F-X3-G represent a path where the person leaves camera F's view, enters a blind spot and then reappears in camera G's view. The edges F-FG-G represent a path where the person moves through a space that can be viewed by both camera F and camera G. The edge F-G represents a path where the two cameras have non-overlapping but adjacent views, so that the person moves from one view to the other but without overlap or blind spot.

FIG. 3H shows an example of a completed proximity graph. FIG. 3I shows the same proximity graph but laid out in a more linear fashion. In the final proximity graph, the nodes representing viewed spaces preferably are mutually exclusive so that an object can only be at one node at any time. For example, nodes F and FG represent mutually exclusive spaces. Node F is the space viewed only by camera F and not by camera G, while node FG is the space viewed by both cameras F and G. The spaces represented in the proximity graph preferably are also collectively exhaustive of the physical environment viewed by the cameras.

In one approach, this is accomplished by defining different groups of cameras and then assigning a node to each group. The node assigned to a group represents the space that is viewed by all of the cameras in the group and not by any cameras outside the group. As a result, the spaces viewed by any two different groups of cameras will be represented by different nodes in the proximity graph, even if some cameras belong to both groups.

Information besides just the tracking of objects can also be used to construct the proximity graph. For example, images captured by the cameras may be analyzed to determine what type of space is being viewed and this information can be used in constructing the proximity graph. In FIG. 3, the images captured by cameras C, D and E may be recognized as interior spaces; while cameras A, B, F and G are viewing outside spaces. The images for the interior spaces may be further analyzed to determine the location and/or number of entries and exits to rooms, adding edges representing the different entries and exits although the node on the other end of the edge may not yet be known. The images may also identify objects that are visible by more than one camera, thus providing evidence of overlapping views. Using this information, the proximity graph in FIG. 3 may be initiated as shown in FIG. 3J, rather than as just the set of bare nodes shown in FIG. 3A.

The images may be processed to provide further information about the spaces viewed. Based on the presence of certain appliances, cabinet layout, sinks and faucets and other specific physical attributes, camera D's view may be recognized as a kitchen. The long narrow shape and the large number of doors in the space viewed by camera E may identify it as a hallway. A toilet, bathtub or shower may identify bathrooms, and beds may identify bedrooms. A relatively narrow outdoor space with a partial view of a street may identify camera B's view as a side yard. A larger outdoor area with a play structure, BBQ, or deck may be recognized as a backyard. This information can be used in constructing the proximity graph. For example, it is unlikely that the kitchen is connected directly to the bathroom, or that the front door opens directly to the backyard. Thus, if an object is tracked from the front door camera to a backyard camera, this edge is suspect and suggests some type of error.

The geolocations and orientations of the cameras, if known, can also be used to construct the proximity graph. Geolocations can be self-reported by the cameras based on GPS information, or strength of wireless networking signals. Orientation can be self-reported based on an internal magnetic compass. As an example of how this information may be used, if two cameras are determined to both be viewing a living room, with camera A on the west wall facing east and camera B on the east wall facing west, then it is likely these two cameras will have some overlap in their views. On the other hand, a camera viewing the front yard and a camera viewing the backyard are unlikely to overlap in their views.

In this way, the proximity graph of the physical environment viewed by the cameras can be constructed without a priori knowledge of the actual physical layout. Of course, if the layout of the physical environment is available, that additional information could also be used in constructing the proximity graph.

Figure 4:
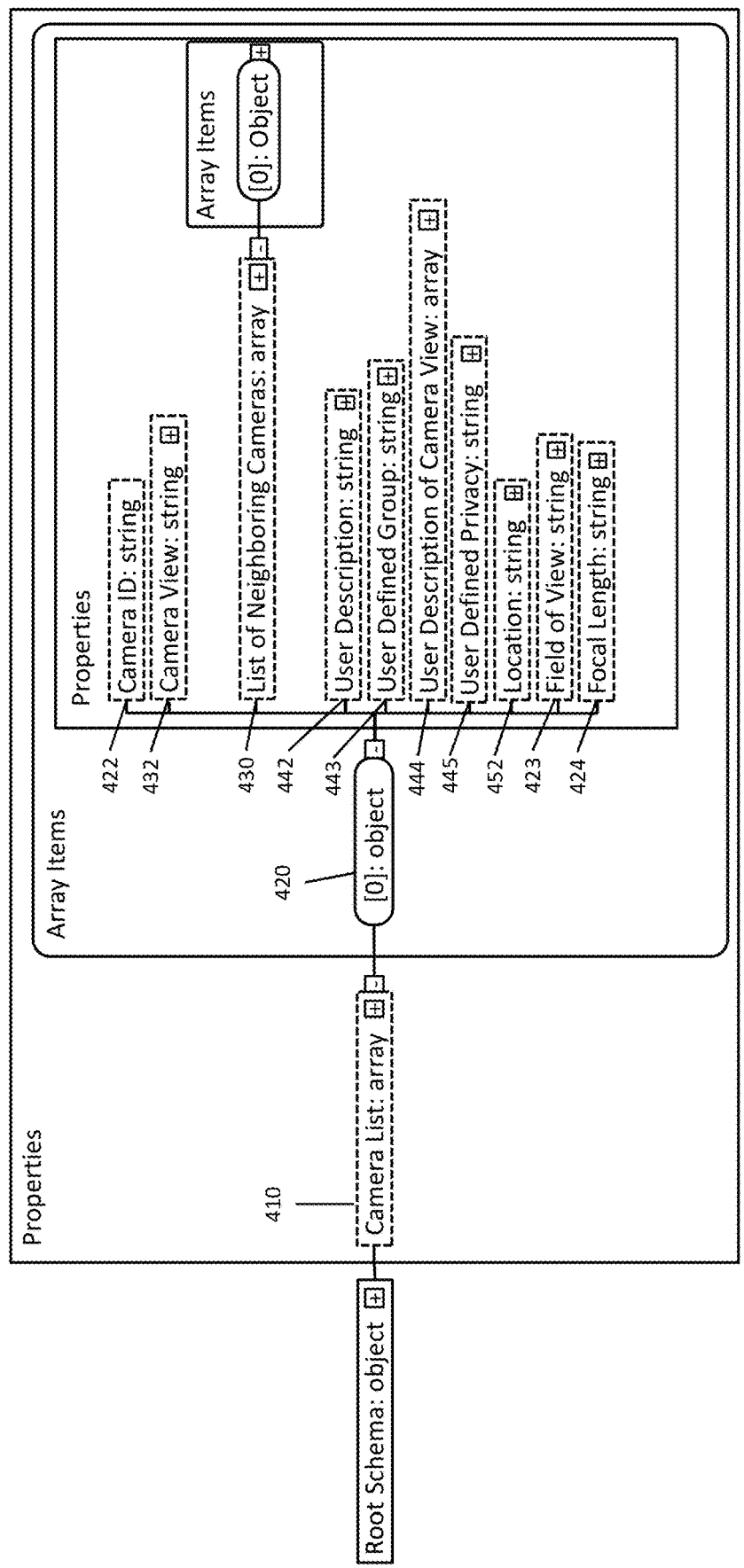
FIG. 4 shows one implementation of a proximity graph as an array of objects.

FIG. 4 shows one implementation of a proximity graph as an array 410 of objects. Each object 420 in the array represents one of the cameras. When a user adds a camera to the network, a new camera object 420 is added to the camera list 410 associated with that network or user. Each object 420 has an ID and a list 430 of neighboring cameras. The other properties can be provided by different sources. For example, the camera ID 422, field of view 423 and focal length 424 might be provided by the manufacturer or accessed from the camera's record. User-generated or user-provided data can include a description of the camera a 442, a group 443 of cameras to which this camera is assigned, a description 444 of what the camera is viewing (e.g., street or living room) and a privacy setting 445 that describes whether the viewed space is private, public, semi-public, etc.

There are several ways in which the location 452 of the camera may be captured. It might be provided by GPS services on the camera. It might be manually entered by the user. It may be determined using an app on a mobile device, which makes use of the mobile device's GPS. The app could be manually operated by an end user. For example, it could generate a QR code that is captured by the camera and fed back to the cloud, using a near-field communication connection to the camera to provide the camera its location or use the camera on the mobile to read the QR code from the camera and the app transfers the location to the cloud.

Each camera has an automatically generated "Camera View" parameter 432 which is generated by an AI algorithm analyzing images captured by the camera. For example, the AI may automatically detect that the camera is in a kitchen or bedroom, based on the contents of the image. The list 430 of neighboring cameras contains the list of relationships between the camera and the other cameras adjacent to the camera. In this example, the data structure for each neighboring camera contains:

Probability that an object or person leaving this camera's field of view will appear next in that particular neighboring camera's field of view.

Delay, which is the average time between when an object disappears from this camera's field of view until it reappears in the adjacent camera's field of view.

Overlap. If TRUE then this camera's field of view overlaps with the neighboring camera's field of view.

If the camera is moved to a new location, the user-provided data 422-425 and location 452 may be reset. Auto-discovery will also update the "Camera View" parameter 432 and the list 430 of neighboring cameras.

In gathering a large amount of information, some of the information may be conflicting. Accordingly, a statistical approach can be used to construct the proximity graph, where nodes and edges are constructed based on the most likely outcomes. In such an approach, older data may be given less weight. In one approach, information before a certain time is discarded entirely. For example, if a camera is moved to a new position or rotated to a new orientation, data captured before the change may be discarded. The change itself may be detected based on comparing images from different times or by detecting an inconsistency in data that begins abruptly at a certain time.

Machine learning and adaptive techniques can also be used to construct the proximity graph. In one approach, each camera maintains records for the other cameras in the network. Each time an object disappears from camera A's field of view, the identity of the next camera that detects the object and the delay between sightings is recorded in camera A's record. By taking a threshold of the number of times an object appears in a camera B's field of view shortly after leaving camera A's field of view, a link can be established between cameras A and B. The delay between sightings can be used to add a temporal distance component to the link.

With respect to the TimeLines for the cameras, the following types of data could be captured in a TimeLine:
  Time stamp
  Geolocation: Spatial coordinates X,Y,Z
  Available Identification: Facial Recognition, Color Clothing, IR Label, IR LED, etc.
  Identification(s): Face, Colors, IR Label, and Data sent via IR etc.
  Image(s) (possibly more than one image): RGB and IR
  Depth Information: Time of Flight, Structured Light, Depth by Deblur
  Velocity, Motion
  Points of interest attached to object
  Optical flow to track motion
  Center of mass (CM), size, CM motion vector, confidence level, etc.
  Objects in Proximity: Range, Contact Yes/No
  Image Capture Settings
  Number of people in the scene (via Human detection)
  Who is in the scene (via Face Recognition with known face database)
  Mood, expression, sex, age, ethnicity information
  Objects detected (Knife, gun, axe, hammer . . . )
  Information from other sensors (temperature, etc.)

Many of these can be used to assist or enhance tracking of objects. For example, identifying objects, estimating the location or depth of objects, and estimating the motion of objects can all be used directly in tracking objects. If the TimeLine includes metadata, that may also be used. For example, if the metadata lists identified objects and their locations—John Doe located at (x1,y1,z1), robot vacuum machine located at (x2,y2,z2), etc.—this information could also be used. If the TimeLine includes enhanced imagery, such as three-dimensional imagery or multiple images per time stamp (wide field of view, close-up of specific object, infrared), those could also be used to enhance tracking and to construct the proximity graph.

The proximity graph described above can be used in conjunction with sensor networks based on Scenes and SceneData, as further described below. In particular, the TimeLines can include or be based on SceneData, to provide a more robust and rich data source for constructing the proximity graph.

Once constructed, information from the proximity graph can be included as part of SceneData. For example, the proximity graph may be used in tracking objects through the physical environment. This may form the basis of various services. A home security service may be based on tracked movements that are anomalous in light of the proximity graph. For example, if a person first appears in the kitchen (node D of FIG. 3I) without having first entered through one of the normal accesses to this environment (nodes A, G or B), this may trigger an alert for a possible burglary. If that person is not recognized as a regular occupant of the house and the person is moving through all the rooms in quick succession, that may be further evidence of a burglary.

As another example, for a frail care service, if an object is recognized as an elderly person and that person is tracked as leaving the hallway for the bathroom but then does not reenter the hallway for an overly long period of time, that may trigger an alert. As a final example, if a toddler enters a corridor which leads only to a woodworking workshop, that may trigger an alert even before the toddler enters the dangerous workshop.

One approach uses a Recursive Neural Network (RNN) and in particular a Long Short-Term Memory Recursive Neural Network (LSTM RNN) which is designed to learn patterns in time-based behavior and create a predictive model of events most likely to occur next. This model would enable more sophisticated analysis and also enable detection of anomous activity. The LSTM RNN could raise an alarm if the movement through the home or environment occurred in an unexpected fashion. For example, an elderly person normally has a regular pattern of movement throughout his home. An alarm can be generated when the person's actual movement deviates from what the LSTM RNN predicts should occur. This is analogous to the use of LSTM RNN in network security applications, where the LSTM network learns "normal" behavior and detects when a piece of network traffic between two devices deviates from the normal behavior. In this case, the LSTM RNN is learning actual physical traffic patterns. These types of networks are trained by feeding the data that describes the motion and movement between cameras.

These alerts and information may be included in SceneData and SceneMarks, as further described below. See also U.S. patent application Ser. No. 15/469,380 "Scene-Based Sensor Networks," Ser. No. 15/487,416 "Scene Marking," and Ser. No. 15/642,311 "Security for Scene-Based Sensor Networks," all of which are incorporated by reference herein in their entirety.

Figure 5:
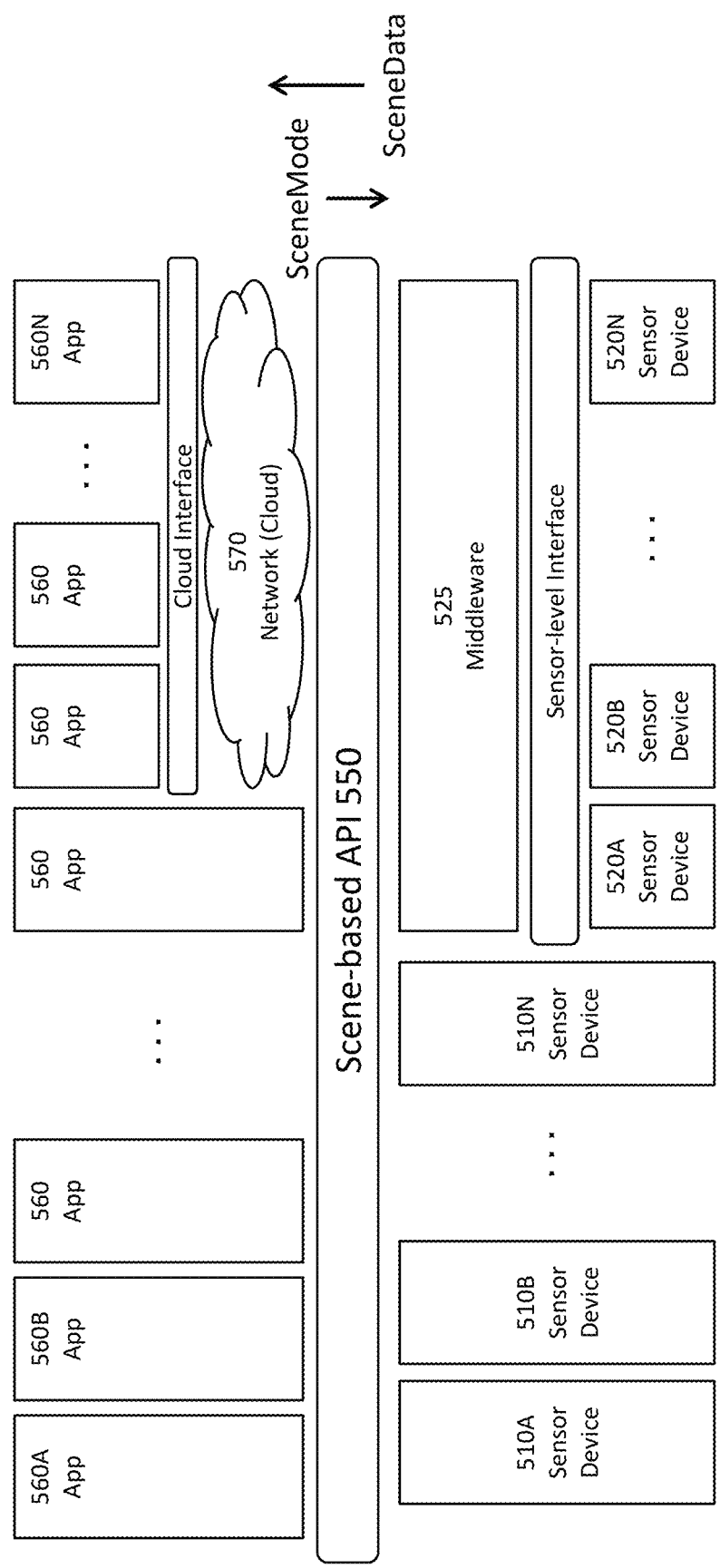
FIG. 5 is a block diagram of a technology stack using Scenes.

FIG. 5 is a block diagram of a technology stack using Scenes. In this example, there are a number of sensor devices 510A-N, 520A-N that are capable of capturing sensor data. Examples of sensor devices include cameras and other image capture devices, including monochrome, single-color, multi-color, RGB, other visible, IR, 4-color (e.g., RGB+IR), stereo, multi-view, strobed, and high-speed; audio sensor devices, including microphones and vibration sensors; depth sensor devices, including LIDAR, depth by deblur, time of flight and structured light devices; and temperature/thermal sensor devices. Other sensor channels could also be used, for example motion sensors and different types of material detectors (e.g., metal detector, smoke detector, carbon monoxide detector). There are a number of applications 560A-N that consume the data captured by the sensor devices 510, 520.

The technology stack from the sensor devices 510, 520 to the applications 560 organizes the captured sensor data into Scenes, and Scenes of interest are marked by SceneMarks, which are described in further detail below. In this example, the generation of Scenes and SceneMarks is facilitated by a Scene-based API 550, although this is not required. Some of the applications 560 access the sensor data and sensor devices directly through the API 550, and other applications 560 make access through networks which will generically be referred to as the cloud 570. As used herein, the "cloud" generally refers to a remote server and/or aggregate (micro-) services, including local counterparts, i.e. a local server or an entity that operates as an extension of the cloud to offer local compute capabilities that may partially or completely replace the need for remote services. The sensor devices 510, 520 and their corresponding data can also make direct access to the API 550, or can make access through the cloud (not shown in FIG. 5).

In FIG. 5, some of the sensor devices 510 are directly compatible with the Scene-based API 550. For other sensor devices 520, for example legacy devices already in the field, compatibility can be achieved via middleware 525. For convenience, the technology stack from the API 550 to the sensor devices 510, 520 will be referred to as the sensor-side stack, and the technology stack from the API 550 to the applications 560 will be referred to as the application-side stack.

The Scene-based API 550 and SceneMarks preferably are implemented as standard. They abstract away from the specifics of the sensor hardware and also abstract away from implementation specifics for processing and analysis of captured sensor data. In this way, application developers can specify their data requirements at a higher level and need not be concerned with specifying the sensor-level settings (such as F/#, shutter speed, etc.) that are typically required today. In addition, device and module suppliers can then meet those requirements in a manner that is optimal for their products. Furthermore, older sensor devices and modules can be replaced with more capable newer products, so long as compatibility with the Scene-based API 550 is maintained.

FIG. 5 shows multiple applications 560 and multiple sensor devices 510, 520. However, any combinations of applications and sensor devices are possible. It could be a single application interacting with one or more sensor devices, one or more applications interacting with a single sensor device, or multiple applications interacting with multiple sensor devices. The applications and sensor devices may be dedicated or they may be shared. In one use scenario, a large number of sensor devices are available for shared use by many applications, which may desire for the sensor devices to acquire different types of data. Thus, data requests from different applications may be multiplexed at the sensor devices. For convenience, the sensor devices 510, 520 that are interacting with an application will be referred to as a sensor group. Note that a sensor group may include just one device.

The system in FIG. 5 is Scene-based, which takes into consideration the context for which sensor data is gathered and processed. Using video cameras as an example, a conventional approach may allow/require the user to specify a handful of sensor-level settings for video capture: f-number, shutter speed, frames per second, resolution, etc. The video camera then captures a sequence of images using those sensor-level settings, and that video sequence is returned to the user. The video camera has no context as to why those settings were selected or for what purpose the video sequence will be used. As a result, the video camera also cannot determine whether the selected settings were appropriate for the intended purpose, or whether the sensor-level settings should be changed as the scene unfolds or as other sensor devices gather relevant data. The conventional video camera API also does not specify what types of additional processing and analysis should be applied to the captured data. All of that intelligence resides on the application-side of a conventional sensor-level API.

In contrast, human understanding of the real world generally occurs at a higher level. For example, consider a security-surveillance application. A "Scene" in that context may naturally initiate by a distinct onset of motion in an otherwise static room, proceed as human activity occurs, and terminate when everyone leaves and the room reverts to the static situation. The relevant sensor data may come from multiple different sensor channels and the desired data may change as the Scene progresses. In addition, the information desired for human understanding typically is higher level than the raw image frames captured by a camera. For example, the human end user may ultimately be interested in data such as "How many people are there?", "Who are they?", "What are they doing?", "Should the authorities be alerted?" In a conventional system, the application developer would have to first determine and then code this intelligence, including providing individual sensor-level settings for each relevant sensor device.

In the Scene-based approach of FIG. 5, some or all of this is moved from the application-side of the API 550 to the sensor-side of the API, for example into the sensor devices/modules 510,520, into the middleware 525, or into other components (e.g., cloud-based services) that are involved in generating SceneData to be returned across the API. As one example, the application developer may simply specify different SceneModes, which define what high level data should be returned to the application. This, in turn, will drive the selections and configurations of the sensor channels optimized for that mode, and the processing and analysis of the sensor data. In the surveillance example, the application specifies a Surveillance SceneMode, and the sensor-side technology stack then takes care of the details re: which types of sensor devices are used when, how many frames per second, resolution, etc. The sensor-side technology stack also takes care of the details re: what types of processing and analysis of the data should be performed, and how and where to perform those.

For certain applications, such as when the automatic processing of video streams may lead to actions being taken (for example raising an alert if an unauthorized person has entered an area, an unauthorized object is detected, etc.), the reliability and integrity of the video stream from the camera to AI processing in the cloud is important. The encryption and authentication of the video and other sensor data becomes an important mechanism to ensure that the video stream has not been tampered with. To enable an entity that is processing the video, to detect that the video has been tampered with, time stamps or counters can be inserted into the stream, typically as part of the video encoding process. The detection of missing time stamps or counters enables the receiving party to detect that the video has been tampered with. The time stamps or counters may be protected from tampering by either being part of the encrypted video payload and or being included in a hash function that is contained in the encrypted payload or is carried separately and is included in a signature mechanism that enables the receiving party to verify that the hash result is obtained from a valid source. By checking that the counters or time stamps are present in the decrypted stream, the receiver can verify that parts of the video sequence have not been removed or replaced.

In a general sense, a SceneMode defines a workflow which specifies the capture settings for one or more sensor devices (for example, using CaptureModes as described below), as well as other necessary sensor behaviors. It also informs the sensor-side and cloud-based computing modules in which Computer Vision (CV) and/or AI algorithms are to be engaged for processing the captured data. It also determines the requisite SceneData and possibly also SceneMarks in their content and behaviors across the system workflow.

In FIG. 5, this intelligence resides in the middleware 525 or in the devices 510 themselves if they are smart devices (i.e., compatible with the Scene-based API 550). Auxiliary processing, provided off-device or on a cloud basis, may also implement some of the intelligence required to generate the requested data.

This approach has many possible advantages. First, the application developers can operate at a higher level that preferably is more similar to human understanding. They do not have to be as concerned about the details for capturing, processing or analyzing the relevant sensor data or interfacing with each individual sensor device or each processing algorithm. Preferably, they would specify just a high-level SceneMode and would not have to specify any of the specific sensor-level settings for individual sensor devices or the specific algorithms used to process or analyze the captured sensor data. In addition, it is easier to change sensor devices and processing algorithms without requiring significant rework of applications. For manufacturers, making smart sensor devices (i.e., compatible with the Scene-based API) will reduce the barriers for application developers to use those devices.

An additional advantage from a security perspective is that the user can determine how much data or images may be made available to a third party. For example SceneData may show people within the view of the camera interacting and the audio may capture what is being said between the parties. The AI systems may extract the identities of the two persons in the camera view. With the concept of SceneData, the user may allow the identities of the two persons to be accessed but may deny access to the actual video and audio content. SceneData and appropriate security can allow other systems to have intermediate access or access due to the result of a specific event. The user may also configure the system to enable access to be granted to SceneData in the event of a specific event or detected feature within the video. For example, in case of a specific face being detected, a notification may be sent to a third party (for example the police) and access may be granted to the video feed. In such case, a field may be added to scene data indicating that it was accessed by a third party, including the conditions or reasons as to why it was accessed. This record of access may be also be stored in some other log file, which may or may not include a signature.

In some cases, rights objects (described in more detail below) are used to define who has access to what. The contents of a rights object may define that in case of access, the access should be logged in a secure log file that is part of the SceneData and also may define that access may be allowed only in case of a predefined condition or event occurring. For example, raw video footage may be accessed only if a firearm is detected. In this example, the video may be processed by an AI system that can detect firearms. A second system operated by the armed response service company may have access to the result of the firearm detection. If a firearm is detected then the rights object that has been provided by a privacy management system will state that the rights agent for the armed response service may decrypt the raw video in case of the firearm being detected. It will also indicate that a record of this access shall be appended to the SceneData. More generally, the rights agents for certain parties (e.g., police, fire, rescue, law enforcement) may decrypt certain raw video in cases of emergency.

Returning to FIG. 5, the data returned across the API 550 will be referred to as SceneData, and it can include both the data captured by the sensor devices, as well as additional derived data. It typically will include more than one type of sensor data collected by the sensor group (e.g., different types of images and/or non-image sensor data) and typically will also include some significant processing or analysis of that data.

This data is organized in a manner that facilitates higher level understanding of the underlying Scenes. For example, many different types of data may be grouped together into timestamped packages, which will be referred to as SceneShots. Compare this to the data provided by conventional camera interfaces, which is just a sequence of raw images. With increases in computing technology and increased availability of cloud-based services, the sensor-side technology stack may have access to significant processing capability and may be able to develop fairly sophisticated SceneData. The sensor-side technology stack may also perform more sophisticated dynamic control of the sensor devices, for example selecting different combinations of sensor devices and/or changing their sensor-level settings as dictated by the changing Scene and the context specified by the SceneMode.

As another example, because data is organized into Scenes rather than provided as raw data, Scenes of interest or points of interest within a Scene may be marked and annotated by markers which will be referred to as SceneMarks. In the security surveillance example, the Scene that is triggered by motion in an otherwise static room may be marked by a SceneMark. SceneMarks facilitate subsequent processing because they provide information about which segments of the captured sensor data may be more or less relevant. SceneMarks also distill information from large amounts of sensor data. Thus, SceneMarks themselves can also be cataloged, browsed, searched, processed or analyzed to provide useful insights.

A SceneMark is an object which may have different representations. Within a computational stack, it typically exists as an instance of a defined SceneMark class, for example with its data structure and associated methods. For transport, it may be translated into the popular JSON format, for example. For permanent storage, it may be turned into a file or an entry into a database.

Figure 6A:
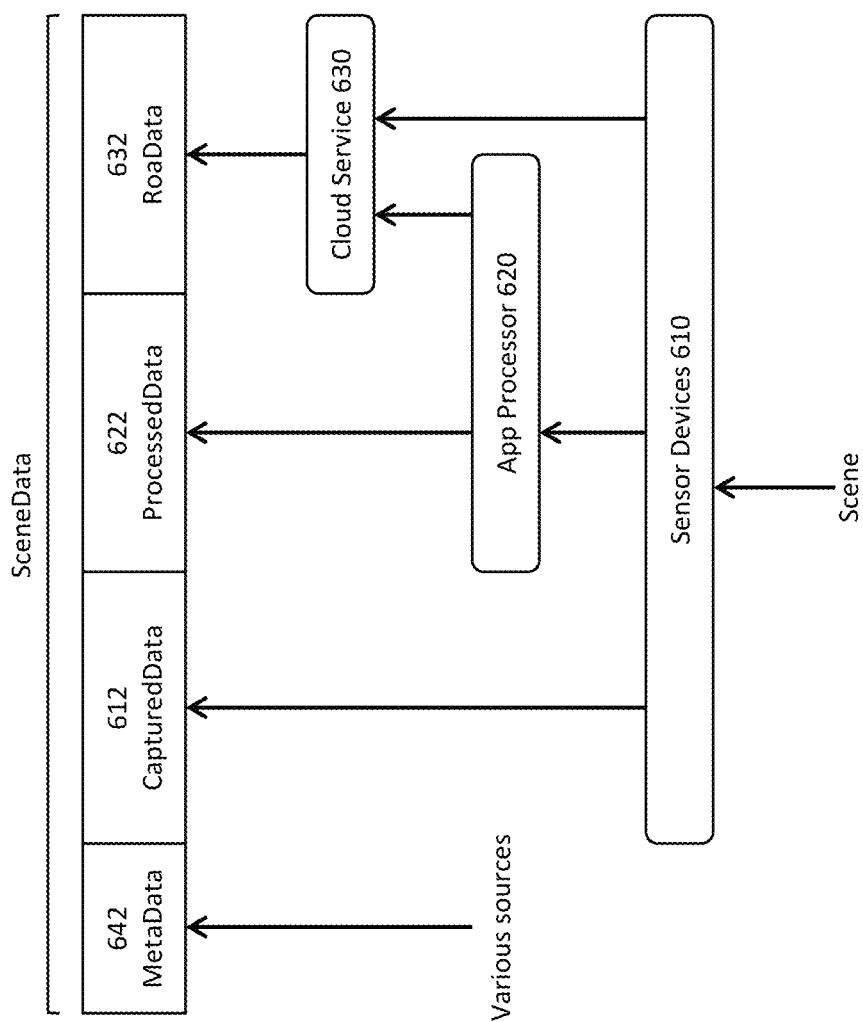
FIG. 6A is a diagram illustrating different types of SceneData.

FIG. 6A is a diagram illustrating different types of SceneData. The base data captured by sensor channels 610 will be referred to as CapturedData 612. Within the video context, examples of CapturedData include monochrome, color, infrared, and images captured at different resolutions and frame rates. Non-image types of CapturedData include audio, temperature, ambient lighting or luminosity and other types of data about the ambient environment. Different types of CapturedData could be captured using different sensor devices, for example a visible and an infrared camera, or a camera and a temperature monitor. Different types of CapturedData could also be captured by a single sensor device with multiple sensors, for example two separate on-board sensor arrays. A single sensor could also be time multiplexed to capture different types of CapturedData—changing the focal length, flash, resolution, etc. for different frames.

CapturedData can also be processed, preferably on-board the sensor device, to produce ProcessedData 622. In FIG. 6A, the processing is performed by an application processor 620 that is embedded in the sensor device. Examples of ProcessedData 622 include filtered and enhanced images, and the combination of different images or with other data from different sensor channels. Noise-reduced images and resampled images are some examples. As additional examples, lower resolution color images might be combined with higher resolution black and white images to produce a higher resolution color image. Or imagery may be registered to depth information to produce an image with depth or even a three-dimensional model. Images may also be processed to extract geometric object representations. Wider field of view images may be processed to identify objects of interest (e.g., face, eyes, weapons) and then cropped to provide local images around those objects. Optical flow may be obtained by processing consecutive frames for motion vectors and frame-to-frame tracking of objects. Multiple audio channels from directed microphones can be processed to provide localized or 7D mapped audio. ProcessedData preferably can be data processed in real time while images are being captured. Such processing may happen pixel by pixel, or line by line, so that processing can begin before the entire image is available.

SceneData can also include different types of MetaData 642 from various sources. Examples include timestamps, geolocation data, ID for the sensor device, IDs and data from other sensor devices in the vicinity, ID for the SceneMode, and settings of the image capture. Additional examples include information used to synchronize or register different sensor data, labels for the results of processing or analyses (e.g., no weapon present in image, or faces detected at locations A, B and C), and pointers to other related data including from outside the sensor group.

Any of this data can be subject to further analysis, producing data that will be referred to generally as ResultsOfAnalysisData, or RoaData 632 for short. In the example of FIG. 6A, the analysis is artificial intelligence/machine learning performed by cloud resources 630. This analysis may also be based on large amounts of other data. Compared to RoaData, ProcessedData typically is more independent of the SceneMode, producing intermediate building blocks that may be used for many different types of later analysis. RoaData tends to be more specific to the end function desired. As a result, the analysis for RoaData can require more computing resources. Thus, it is more likely to occur off-device and not in real-time during data capture. RoaData may be returned asynchronously back to the scene analysis for further use.

SceneData also has a temporal aspect. In conventional video, a new image is captured at regular intervals according to the frame rate of the video. Each image in the video sequence is referred to as a frame. Similarly, a Scene typically has a certain time duration (although some Scenes can go on indefinitely) and different "samples" of the Scene are captured/produced over time. To avoid confusion, these samples of SceneData will be referred to as SceneShots rather than frames, because a SceneShot may include one or more frames of video. The term SceneShot is a combination of Scene and snapshot.

Compared to conventional video, SceneShots can have more variability. SceneShots may or may not be produced at regular time intervals. Even if produced at regular time intervals, the time interval may change as the Scene progresses. For example, if something interesting is detected in a Scene, then the frequency of SceneShots may be increased. A sequence of SceneShots for the same application or same SceneMode also may or may not contain the same types of SceneData or SceneData derived from the same sensor channels in every SceneShot. For example, high resolution zoomed images of certain parts of a Scene may be desirable or additional sensor channels may be added or removed as a Scene progresses. As a final example, SceneShots or components within SceneShots may be shared between different applications and/or different SceneModes, as well as more broadly.

Figure 6B:
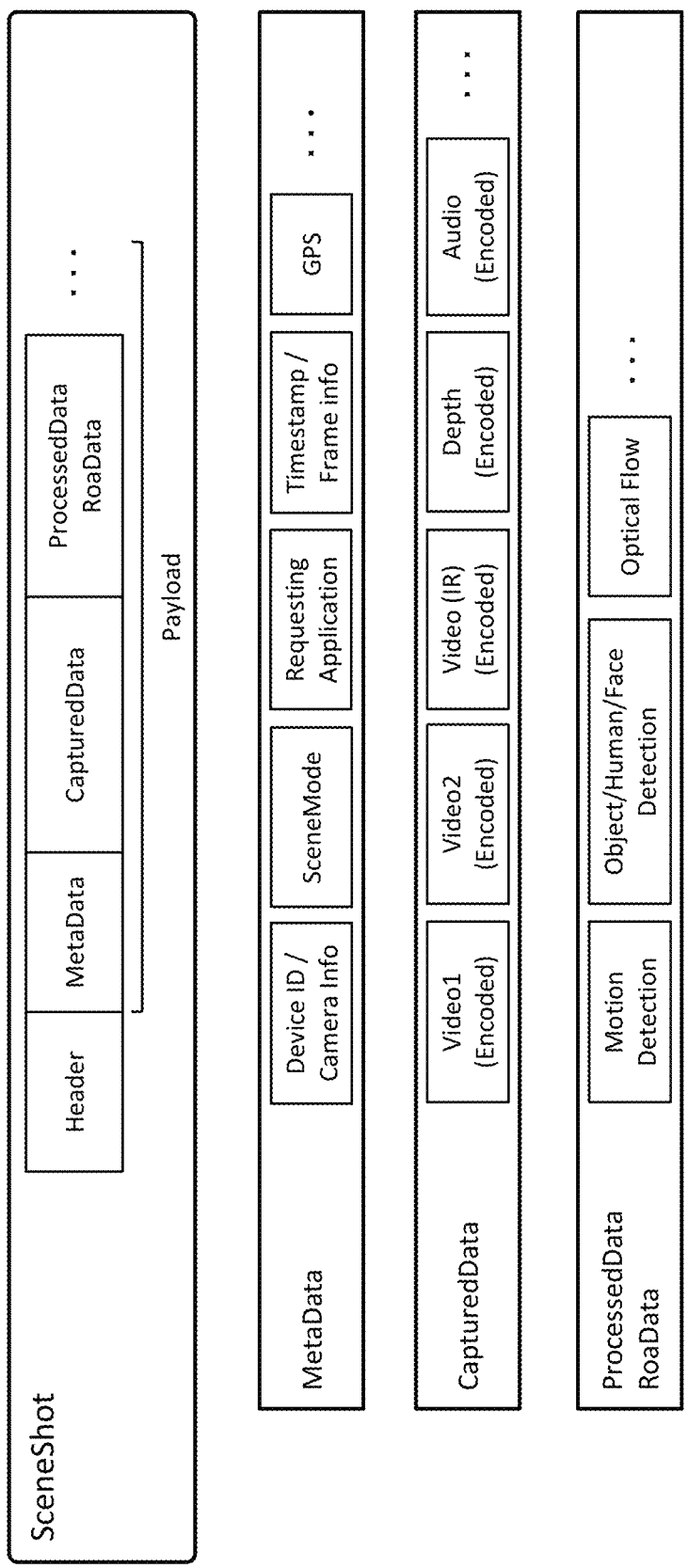
FIG. 6B is a block diagram of a package of SceneData.

FIG. 6B is a block diagram of a SceneShot. This SceneShot includes a header. It includes the following MetaData: sensor device IDs, SceneMode, ID for the requesting application, timestamp, GPS location stamp. The data portion of SceneShot also includes the media data segment such as the CapturedData which may include color video from two cameras, IR video at a different resolution and frame rate, depth measurements, and audio. It also includes the following ProcessedData and/or RoaData: motion detection, object/human/face detections, and optical flow. Unlike conventional video in which each sequential image generally contains the same types of data, the next SceneShot for this Scene may or may not have all of these same components. Note that FIG. 6B is just an example. For example, the actual sensor data may be quite bulky. As a result, this data may be stored by middleware or on the cloud, and the actual data packets of a SceneShot may include pointers to the sensor data rather than the raw data itself. As another example, MetaData may be dynamic (i.e., included and variable with each SceneShot). However, if the MetaData does not change frequently, it may be transmitted separately from the individual SceneShots or as a separate channel.

Figure 6C:
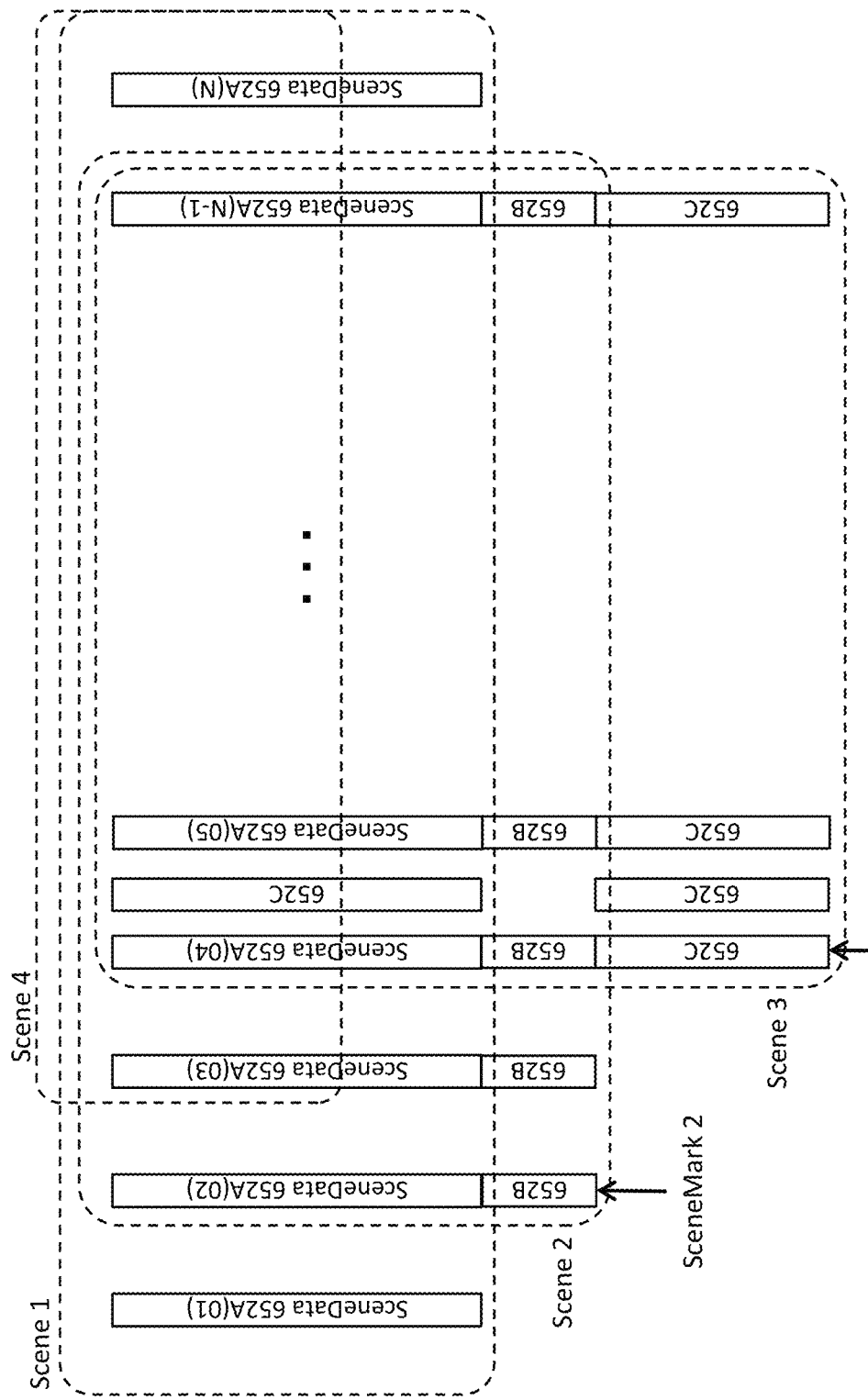
FIG. 6C is a timeline illustrating the use of Scenes and SceneMarks.

FIG. 6C is a timeline illustrating the organization of SceneShots into Scenes. In this figure, time progresses from left to right. The original Scene 1 is for an application that performs after-hours surveillance of a school. SceneData 652A is captured/produced for this Scene 1. SceneData 652A may include coarse resolution, relative low frame rate video of the main entry points to the school. SceneData 652A may also include motion detection or other processed data that may indicative of potentially suspicious activity. In FIG. 6C, the SceneShots are denoted by the numbers in parenthesis (N), so 652A(01) is one SceneShot, 652A(02) is the next SceneShot and so on.

Possibly suspicious activity is detected in SceneShot 652A(01), which is marked by SceneMark 2 and a second Scene 2 is spawned. This Scene 2 is a sub-Scene to Scene 1. Note that the "sub-" refers to the spawning relationship and does not imply that Scene 2 is a subset of Scene 1, in terms of SceneData or in temporal duration. In fact, this Scene 2 requests additional SceneData 652B. Perhaps this additional SceneData is face recognition. Individuals detected on the site are not recognized as authorized, and this spawns Scene 3 (i.e., sub-sub-Scene 3) marked by SceneMark 3. Scene 3 does not use SceneData 652B, but it does use additional SceneData 652C, for example higher resolution images from cameras located throughout the site and not just at the entry points. The rate of image capture is also increased. SceneMark 3 triggers a notification to authorities to investigate the situation.

In the meantime, another unrelated application creates Scene 4. Perhaps this application is used for remote monitoring of school infrastructure for early detection of failures or for preventative maintenance. It also makes use of some of the same SceneData 652A, but by a different application for a different purpose.

Figure 6D:
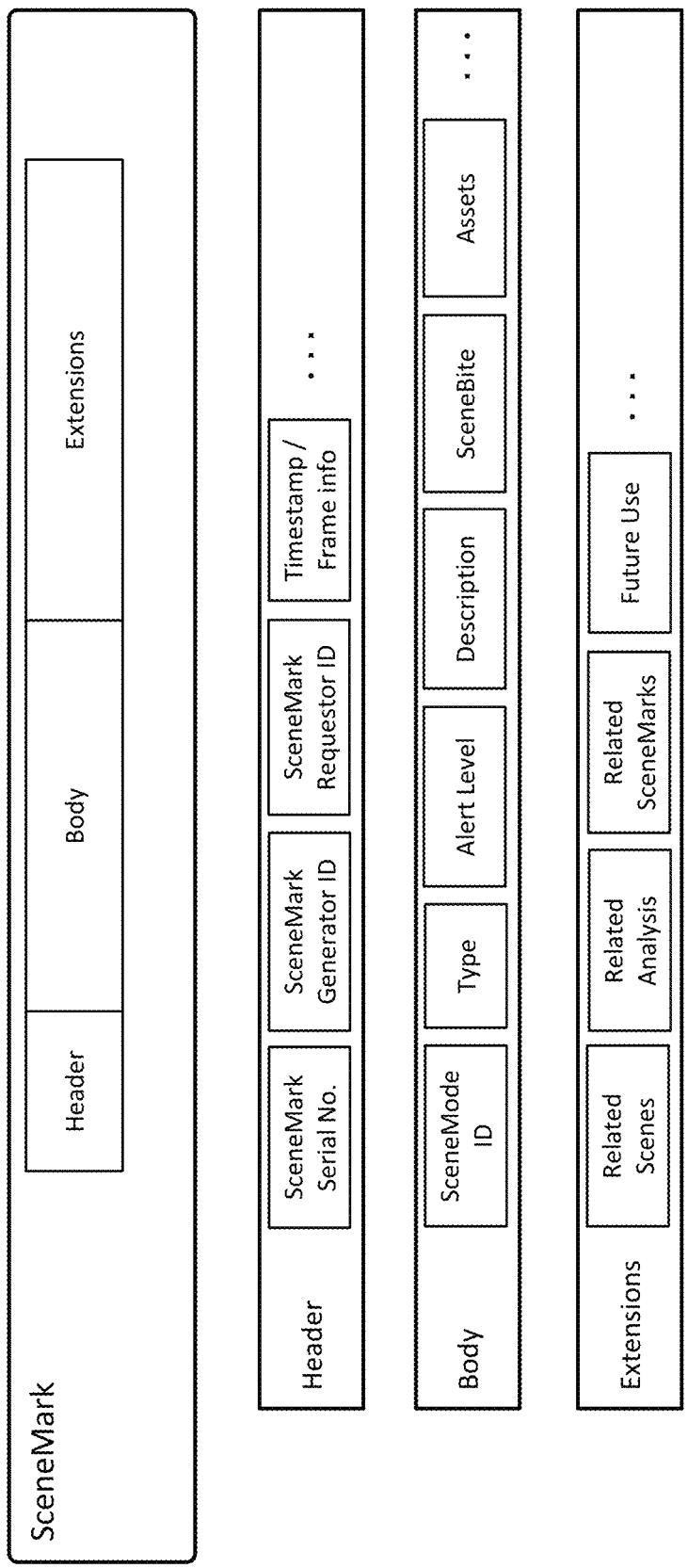
FIG. 6D is a block diagram of a SceneMark.

FIG. 6D is a block diagram of a SceneMark. In this example, the SceneMark includes a header, a main body and an area for extensions. The header identifies the SceneMark. The body contains the bulk of the "message" of the SceneMark. The header and body together establish the provenance for the SceneMark. Supporting data may be included in the body if fairly important and not too lengthy. Alternately, it (or a reference to it) may be included in the extensions.

In this example, the header includes an ID (or a set of IDs) and a timestamp. The Serial No. uniquely identifies the SceneMark. The Generator ID provides information about the source of the SceneMark and its underlying sensor data. The Requestor ID identifies the service or application requesting the related SceneData, thus leading to generation of the SceneMark. In the body, Assets and SceneBite are data such as images and thumbnails. "SceneBite" is analogous to a soundbite for a Scene. It is a lightweight representation of the SceneMark, such as a thumbnail image or short audio clip. Assets are the heavier underlying assets.

Extensions permit the extension of the basic SceneMark data structure. In some cases, it may be useful for SceneMarks to be concatenated into manifest files. FIG. 6D is just an example. For additional details and examples of SceneMarks, see U.S. patent application Ser. No. 15/487,416 "Scene Marking," which is incorporated by reference herein.

The concept of having sequential identifiers on SceneMarks can also be applied to ensure that a SceneMark is not deleted by an unauthorized party. For example if someone wishes to remove a SceneMark generated due to an intruder entering the field of view, this will be detectable if each SceneMark that is generated has a sequence number or a pointer to the SceneMark before and/or after it. These identifiers may be protected by having a hash function applied to the SceneMarks and having a chaining mechanism to chain hashes from multiple SceneMarks into a single hash. The integrity of the hash result should be protected by using a known cryptographic signature technique. Another method to protect the integrity of the pointer or sequence number of the SceneMark is to encrypt the SceneMark using a cypher block chaining technique and to have sufficient structure and or redundancy in the SceneMark to enable the detection of tampering of the encrypted SceneMark. That is, if the encrypted SceneMark is tampered with, the decryption of the tampered SceneMark results in an inconsistency in the data in the SceneMark or in the format of the SceneMark. This inconsistency can be used to detect that the SceneMark has been tampered with.

Figure 7:
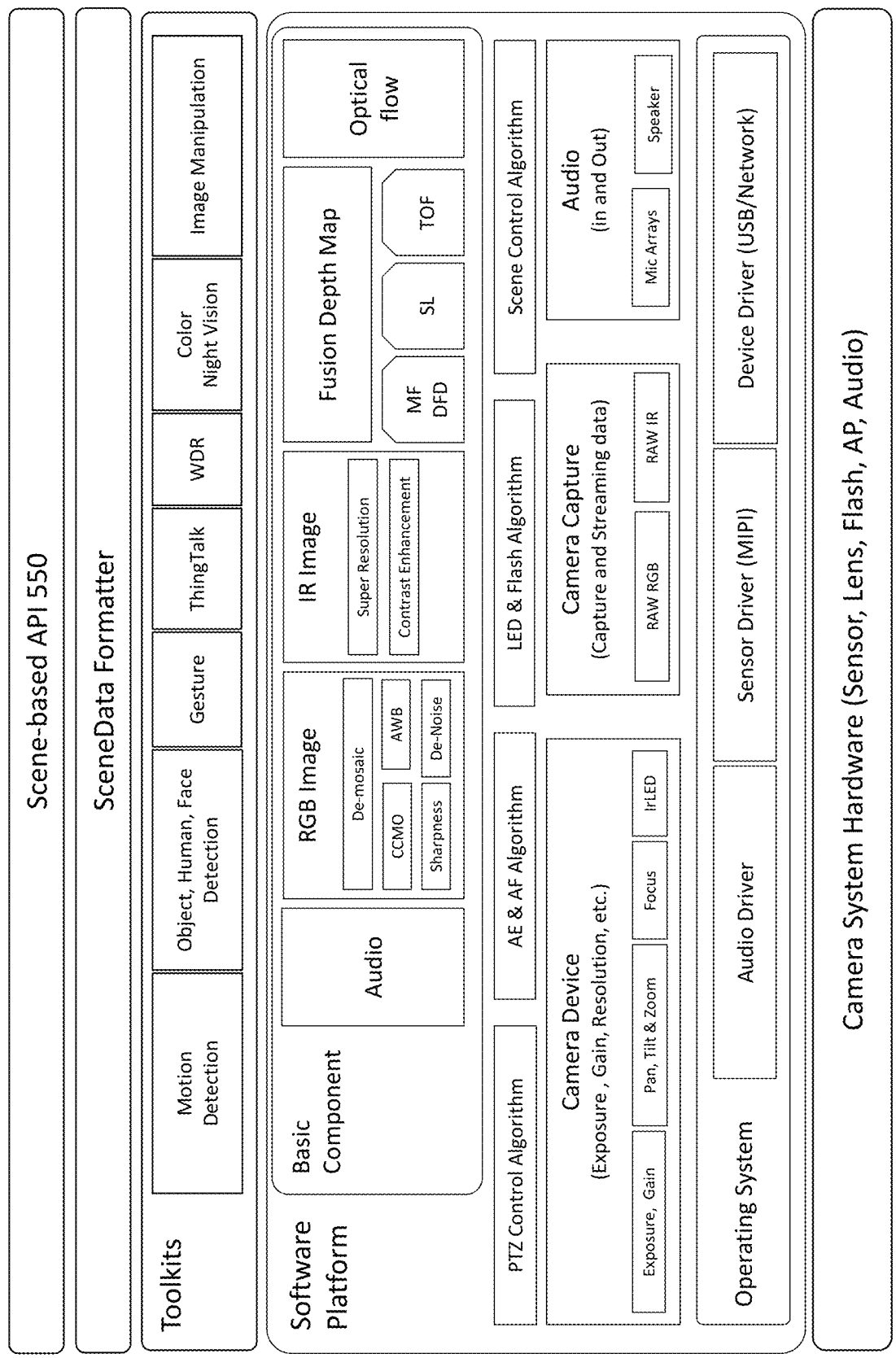
FIG. 7 is a block diagram of middleware that is compliant with a Scene-based API.

Returning to FIG. 5, the applications 560 and sensor channels 510, 520 interface through the Scene-based API 550. The applications 560 specify their SceneModes and the sensor-side technology stack then returns the corresponding SceneData. In many cases, the sensor devices themselves may not have full capability to achieve this. FIG. 7 is a block diagram of middleware 525 that provides functionality to return SceneData requested via a Scene-based API 550. This middleware 525 converts the SceneMode requirements to sensor-level settings that are understandable by the individual sensor devices. It also aggregates, processes and analyzes data in order to produce the SceneData specified by the SceneMode.

The bottom of this stack is the camera hardware. The next layer up is the software platform for the camera. In FIG. 7, some of the functions are listed by acronym to save space. PTZ refers to pan, tilt & zoom; and AE & AF refer to auto expose and auto focus. The RGB image component includes de-mosaicking, CCMO (color correction matrix optimization), AWB (automatic white balance), sharpness filtering and noise filtering/improvement. The fusion depth map may combine depth information from different depth sensing modalities. In this example, those include MF DFD (Multi Focus Depth by Deblur, which determines depth by comparing blur in images taken with different parameters, e.g., different focus settings), SL (depth determined by projection of Structured Light onto the scene) and TOF (depth determined by Time of Flight). Further up are toolkits and then a formatter to organize the SceneData into SceneShots. In the toolkits, WDR refers to wide dynamic range.

In addition to the middleware, the technology stack may also have access to functionality available via networks, e.g., cloud-based services. Some or all of the middleware functionality may also be provided as cloud-based services. Cloud-based services could include motion detection, image processing and image manipulation, object tracking, face recognition, mood and emotion recognition, depth estimation, gesture recognition, voice and sound recognition, geographic/spatial information systems, and gyro, accelerometer or other location/position/orientation services.

Whether functionality is implemented on-device, in middleware, in the cloud or otherwise depends on a number of factors. Some computations are so resource-heavy that they are best implemented in the cloud. As technology progresses, more of those may increasingly fall within the domain of on-device processing. It remains flexible in consideration of the hardware economy, latency tolerance as well as specific needs of the desired SceneMode or the service.

Generally, the sensor device preferably will remain agnostic of any specific SceneMode, and its on-device computations may focus on serving generic, universally utilizable functions. At the same time, if the nature of the service warrants, it is generally preferable to reduce the amount of data transport required and to also avoid the latency inherent in any cloud-based operation.

The SceneMode provides some context for the Scene at hand, and the SceneData returned preferably is a set of data that is more relevant (and less bulky) than the raw sensor data captured by the sensor channels. In one approach, Scenes are built up from more atomic Events. In one model, individual sensor samples are aggregated into SceneShots, Events are derived from the SceneShots, and then Scenes are built up from the Events. SceneMarks are used to mark Scenes of interest or points of interest within a Scene. Generally speaking, a SceneMark is a compact representation of a recognized Scene of interest based on intelligent interpretation of the time- and/or location-correlated aggregated Events.

The building blocks of Events are derived from monitoring and analyzing sensory input (e.g. output from a video camera, a sound stream from a microphone, or data stream from a temperature sensor). The interpretation of the sensor data as Events is framed according to the context (is it a security camera or a leisure camera, for example). Examples of Events may include the detection of a motion in an otherwise static environment, recognition of a particular sound pattern, or in a more advanced form recognition of a particular object of interest (such as a gun or an animal). Events can also include changes in sensor status, such as camera angle changes, whether intended or not. General classes of Events includes motion detection events, sound detection events, device status change events, ambient events (such as day to night transition, sudden temperature drop, etc.), and object detection events (such as presence of a weapon-like object). The identification and creation of Events could occur within the sensor device itself. It could also be carried out by processor units in the cloud.

Note that Scenes can also be hierarchical. For example, a Motion-in-Room Scene may be started when motion is detected within a room and end when there is no more motion, with the Scene bracketed by these two timestamps. Sub-Scenes may occur within this bracketed timeframe. A sub-Scene of a human argument occurs (e.g. delimited by ArgumentativeSoundOn and Off time markers) in one corner of the room. Another sub-Scene of animal activity (DogChasingCatOn & Off) is captured on the opposite side of the room. This overlaps with another sub-Scene which is a mini crisis of a glass being dropped and broken. Some Scenes may go on indefinitely, such as an alarm sound setting off and persisting indefinitely, indicating the lack of any human intervention within a given time frame. Some Scenes may relate to each other, while others have no relations beyond itself.

Depending on the application, the Scenes of interest will vary and the data capture and processing will also vary. FIG. 8 illustrates an example SceneMode #1, which in this example is used by a home surveillance application. In the lefthand side of FIG. 8, each of the icons on the dial represents a different SceneMode. In FIG. 8, the dial is set to the house icon which indicates SceneMode #1. The SceneData specified by this SceneMode is shown in the righthand side of FIG. 8. The SceneData includes audio, RGB frames, IR frames. It also includes metadata for motion detection (from optical flow capability), human detection (from object recognition capability) and whether the humans are known or strangers (from face recognition capability). To provide the required SceneData, the sensor-side technology stack typically will use the image and processing capabilities which are boxed on the lefthand side of FIG. 8: exposure, gain, RGB, IR, audio, optical flow, face recognition, object recognition and P2P, and sets parameters for these functions according to the mode. Upon detection of unrecognized humans, the application sounds an alarm and notifies the owner. The use of SceneData beyond just standard RGB video frames helps to achieve automatic quick detection of intruders, triggering appropriate actions.

Figure 9:
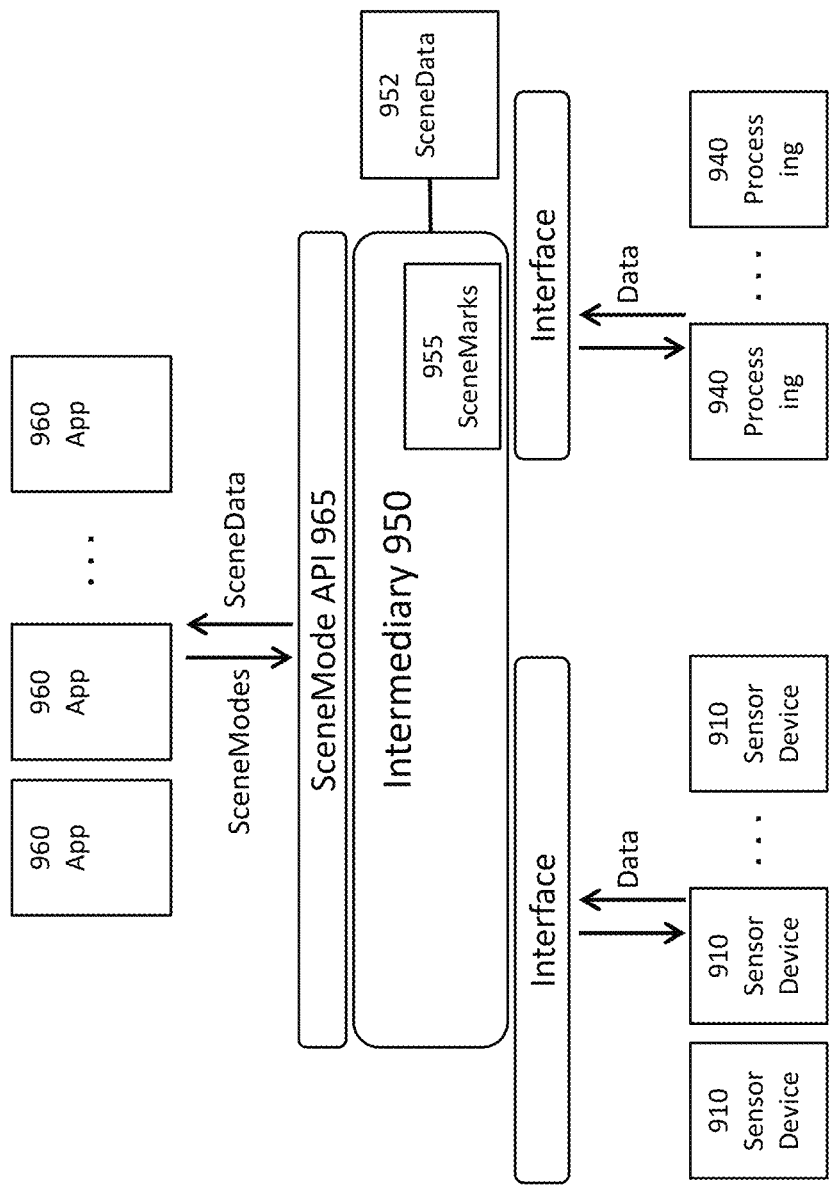
FIG. 9 is a block diagram of a third party providing intermediation services.

FIG. 9 is a block diagram in which a third party 950 provides intermediation services between applications 960 requesting SceneData and sensor networks 910 capable of capturing the sensor data requested. The overall ecosystem may also include additional processing and analysis capability 940, for example made available through cloud-based services. In one implementation, the intermediary 950 is software that communicates with the other components over the Internet. It receives the requests for SceneData from the applications 960 via a SceneMode API 965. The requests are defined using SceneModes, so that the applications 960 can operate at higher levels. The intermediary 950 fulfills the requests using different sensor devices 910 and other processing units 940. The generated SceneData and SceneMarks are returned to the applications 960. The intermediary 950 may store copies of the SceneMarks 955 and the SceneData 952 (or, more likely, references to the SceneData). Over time, the intermediary 950 will collect a large amount of SceneMarks 955, which can then be further filtered, analyzed and modified. The intermediary 950 may also provide the synchronization service 110 of FIG. 1, to construct the proximity graph. In that case, the synchronization service (i.e., intermediary 950) may receive the TimeLines for the cameras via the Scene-based API 550.

As described above, SceneData can include many different types of data, ranging from the original captured sensor data to data that is the result of complex processing and/or analysis. This processing and analysis may not all occur at the same time and may be requested and/or performed by different entities. For example, one (or more) entities may direct cameras and other sensor devices to capture certain sensor data. That sensor data can be processed, individually or in aggregates, according to requests made by other entities at other times. As a result, different SceneData may be requested, created and distributed by different entities at different times. This sharing of data and access to sensor devices is beneficial, but it also increases the security risk. Not all entities should have access to all data and to all sensor devices.

Although the detailed description contains many specifics, these should not be construed as limiting the scope of the invention but merely as illustrating different examples. It should be appreciated that the scope of the disclosure includes other embodiments not discussed in detail above. For example, the proximity graph is not limited to residential houses. It could also be applied to industrial, retail and office buildings. It also is not limited to buildings. It could also be applied to large venues (e.g., stadiums, arenas), campuses, traffic, and outdoor environments (parks, waterways), just to name a few. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method implemented on a computer system for discovering a relative positioning of a network of cameras that view a physical environment, the method comprising:
  receiving TimeLines for the cameras, each TimeLine for a camera comprising a sequences of time stamps and data relating to the camera's view at those time stamps, the data including images captured by the camera at those time stamps;
  comparing the TimeLines captured by the cameras;
  determining a proximity of a plurality of spaces viewed by the cameras, based on the comparison of the TimeLines, wherein the spaces are defined by the views of the cameras; and
  constructing a proximity graph of the proximity of the spaces viewed by the cameras, the proximity graph comprising nodes connected by edges, the nodes representing the spaces defined by the views of the cameras and each edge between two nodes representing a pathway between the spaces represented by the two nodes.

2. The computer-implemented method of claim 1 wherein comparing the TimeLines captured by the cameras comprises:
   identifying an object in the images captured by the cameras; and
   tracking the object through the spaces viewed by the cameras, wherein the proximity graph is constructed based on tracking the object through the spaces viewed by the cameras.

3. The computer-implemented method of claim 2 wherein:
   the object is tracked as moving without delay from viewed by a first group of one or more cameras to viewed by a different second group of one or more cameras;
   the spaces viewed by the first and second groups of cameras are represented by existing first and second nodes in the proximity graph; and
   constructing the proximity graph comprises adding an edge between the existing first node and the existing second node.

4. The computer-implemented method of claim 2 wherein:
   the object is tracked as moving from viewed by a first group of one or more cameras to viewed by a different second group of one or more cameras, but with a delay during which the object is not viewed by any camera;
   the spaces viewed by the first and second groups of cameras are represented by existing first and second nodes in the proximity graph; and
   constructing the proximity graph comprises adding a new node for a non-viewed space, adding an edge between the existing first node and the new node for the non-viewed space, and adding an edge between the new node and the existing second node.

5. The computer-implemented method of claim 2 wherein:
   the object is tracked as moving from viewed by only a first camera to viewed by both a first and a second camera;
   the space viewed by the first camera is represented by an existing first node in the proximity graph, but no node in the proximity graph represents the space viewed by both the first and second cameras; and
   constructing the proximity graph comprises adding a new node representing the space viewed by both the first and second cameras, and adding an edge between the existing first node and the new node.

6. The computer-implemented method of claim 1 wherein every camera in the network is represented by at least one node in the proximity graph.

7. The computer-implemented method of claim 1 wherein spaces viewed by two different groups of cameras are represented by two different nodes in the proximity graph, even if some cameras are in both groups.

8. The computer-implemented method of claim 1 wherein a space viewed by only one camera is represented by a different node than a space viewed by that one camera plus one or more other cameras.

9. The computer-implemented method of claim 1 wherein the proximity graph includes nodes that represent spaces that are not viewed by any camera in the network.

10. The computer-implemented method of claim 1 further comprising:
    analyzing an image captured by a camera to determine a type of space viewed by that camera, wherein the proximity graph is constructed further based on the types of spaces viewed by cameras.

11. The computer-implemented method of claim 1 wherein the network of cameras views rooms within a building, the method further comprising:
    analyzing an image captured by a camera to identify entries and exits to rooms viewed by that camera, wherein the proximity graph is constructed further based on the entries and exits viewed by cameras.

12. The computer-implemented method of claim 1 wherein a synchronization service receives the TimeLines and constructs the proximity graphs.

13. The computer-implemented method of claim 11 wherein the synchronization service receives the TimeLines via an API.

14. The computer-implemented method of claim 1 wherein the proximity graph is implemented as an array of objects.

15. The computer-implemented method of claim 13 wherein the array of objects includes a list of camera objects, each camera object representing one of the cameras in the network of cameras.

16. The computer-implemented method of claim 13 wherein each camera object includes a list of neighboring cameras.

* * * * *